(12) United States Patent
Abramson et al.

(10) Patent No.: US 8,046,103 B2
(45) Date of Patent: Oct. 25, 2011

(54) SYSTEM AND METHOD FOR DETERMINING THE LOCATION OF A MACHINE

(75) Inventors: Shai Abramson, Har-Halutz (IL); Eli Levi, Raanana (IL)

(73) Assignee: F Robotics Acquisitions Ltd., Kadima (IL)

( * ) Notice: Subject to any disclaimer, the term of this patent is extended or adjusted under 35 U.S.C. 154(b) by 1001 days.

(21) Appl. No.: 11/861,978

(22) Filed: Sep. 26, 2007

(65) Prior Publication Data

US 2008/0097645 A1   Apr. 24, 2008

Related U.S. Application Data

(60) Provisional application No. 60/848,098, filed on Sep. 29, 2006.

(51) Int. Cl.
*G05B 15/00* (2006.01)

(52) U.S. Cl. ........ 700/258; 700/245; 367/103; 367/105; 367/138; 375/149; 405/169; 405/170; 370/350; 370/503; 901/46

(58) Field of Classification Search ............... 700/258, 700/245; 375/149; 405/169, 170; 370/350, 370/503; 367/103, 105, 138; 250/559.29; 166/341; 901/46
See application file for complete search history.

(56) References Cited

U.S. PATENT DOCUMENTS

| | | | |
|---|---|---|---|
| 5,187,664 A * | 2/1993 | Yardley et al. | 701/23 |
| 6,459,955 B1 * | 10/2002 | Bartsch et al. | 700/245 |
| 7,574,282 B2 * | 8/2009 | Petersson et al. | 700/245 |
| 2001/0047231 A1 * | 11/2001 | Peless et al. | 701/23 |
| 2002/0022926 A1 * | 2/2002 | Suzuki | 701/207 |
| 2002/0152044 A1 * | 10/2002 | Shanks et al. | 702/106 |
| 2003/0148922 A1 * | 8/2003 | Knapp et al. | 514/1 |
| 2009/0168972 A1 * | 7/2009 | Cioffi et al. | 379/1.04 |

FOREIGN PATENT DOCUMENTS

| | | |
|---|---|---|
| EP | 1025472 B1 | 10/2002 |
| EP | 1047983 B1 | 3/2005 |
| EP | 162631 A2 | 1/2006 |
| EP | 152053 B1 | 5/2007 |
| WO | 9915941 A1 | 4/1999 |
| WO | 03104908 A1 | 12/2003 |
| WO | WO 2004008799 * | 1/2004 |

* cited by examiner

*Primary Examiner* — James Trammell
*Assistant Examiner* — McDieunel Marc
(74) *Attorney, Agent, or Firm* — Gerry J. Elman; Elman Technology Law, P.C.

(57) ABSTRACT

A system is employed for defining a position (location) of a receiving element inside an area surrounded by a wire loop, along the perimeter (a perimeter wire loop), of a work area or other bounded area. In particular, the system can determine whether the receiver is inside or outside the loop, and evaluate its distance from the perimeter wire.

13 Claims, 18 Drawing Sheets

SYSTEM AND METHOD FOR DETERMINING THE LOCATION OF A MACHINE

CROSS-REFERENCES TO RELATED APPLICATIONS

This application is related to and claims priority from commonly owned U.S. Provisional Patent Application Ser. No. 60/848,098, filed Sep. 29, 2006, entitled: System and Method for Determining the Location of a Machine, the disclosure of which is incorporated by reference herein.

TECHNICAL FIELD

The disclosed subject matter is directed to boundary systems for robots and other autonomous machines, and in particular, to methods and systems for determining robot location within or outside of the bounded areas.

BACKGROUND

Autonomous machines and devices, such as autonomous robots, have been designed for performing various industrial and domestic functions. These domestic functions include lawn mowing, vacuum cleaning, floor sweeping and maintenance. By extending robots to these domestic functions, the person or user employing these robots has increased free or leisure time, as they do not have to expend the time required to perform the aforementioned tasks manually.

Many of these robots and autonomous machines, such as robotic lawnmowers, are designed to cut grass and other vegetation when they are within a bounded area. The bounded area may be formed by a wire or the like, typically placed underground or on the ground, or other marker, to confine the robot to the bounded area.

SUMMARY

The disclosed subject matter includes a system for defining a position (location) of a receiving element (receiver and/or receiver system) inside an area surrounded by a wire loop, along the perimeter (a perimeter wire loop), of a work area or other bounded area. In particular, the system can determine whether the receiver is inside or outside the loop, and evaluate its distance from the perimeter wire. This system is of particular interest for robots working in a defined area, or automatic vehicles that need to follow a wire, but may also be used for other applications such as dog, pet and animal fences, security systems, etc. The system is economical and involves robust implementations of the transmitting and receiving methods.

The system is formed of a perimeter signal generator that transmits signals conducted by the perimeter wire loop and a receiver or receiving circuit and associated control electronics on the robot. The receiver and associated control electronics evaluate parameters including, for example, 1) an amplitude inversely proportional to the distance of the receiver (receiver coil) from the perimeter wire/loop, as well as, 2) the state of whether the receiver (receiver coil) is inside or outside the work area, as defined by the perimeter loop. This is communicated to the control system of the robot or machine, that in turn drives and navigates the robot accordingly.

The disclosed subject matter is directed a robot or machine that includes at least one receiver and a detector, electrically coupled to the receiver. The at least one receiver is for receiving a signal transmitted from a boundary, that may be, for example, a perimeter wire loop that defines the boundary, for example, with a work area inside the loop, and is a closed pathway for signal generation and transmission. The at least one receiver is for receiving a transmitted signal that includes at least one positive pulse and at least one negative pulse within a predetermined interval or period. The detector is for detecting peaks in the received signal. These peaks are, for example, major negative peaks, that are analyzed to determine the location of the robot with respect to the boundary and the work area.

The disclosed subject matter is directed to system for determining the location of a receiver with respect to a boundary. The system includes a boundary marker for defining at least one boundary, the boundary marker for supporting at least one signal being transmitted therethrough, the at least one signal including at least one positive pulse and at least one negative pulse within a predetermined interval (period). The boundary marker may be, for example, a perimeter wire loop that defines the boundary, for example, with a work area inside the loop, and is a closed pathway for signal generation and transmission. There is also at least one receiver system including at least one receiver for receiving the at least one signal, and at least one detector electrically coupled to the at least one receiver, the at least one detector configured for detecting peaks in the at least one signal. The peaks, may be for example, major peaks, such as major negative peaks.

The disclosed subject matter is also directed to a method for determining the location of a receiver. The method includes, providing a first loop including a first portion and a second portion, providing a second loop including the second portion and a third portion, and providing a signal over a first loop and providing the signal over a second loop at a predetermined providing interval. The signal providing is such that at least the first portion is always receiving the provided signal, and the second portion and the third portion are receiving the provided signal in accordance with the predetermined providing interval. The method also includes, receiving the signal, converting the signal to pulses, and counting the pulses for a predetermined receiving interval. The counted pulses for the predetermined receiving interval are analyzed against predetermined pulse counts for the predetermined receiving interval in accordance with the predetermined providing interval to determine the location of the receiver. The signal providing may be by a signal generating unit with an internal switch, that switches between loops in accordance with the providing interval, or the aforementioned switch may be separate and outboard from the signal generating unit, that also switches between loops in accordance with the providing interval. The received signal, is, for example, converted to pulses based on detection of the major peaks, such as the major negative peaks.

The disclosed subject matter is also directed to a method for determining the location of a robot with respect to a boundary. The method includes providing a robot. The robot includes at least one receiver for receiving a signal transmitted from a boundary, the transmitted signal including at least one positive pulse and at least one negative pulse within a predetermined transmission interval or period, least one detector electrically coupled to the receiver for detecting peaks in the signal, and a processor electrically coupled to the at least one detector. The processor is programmed to analyze data corresponding to the detected peaks in the signal for determining the location of the robot with respect to the boundary. The method also includes detecting major peaks in the signal, and analyzing data corresponding to the major peaks detected over a predetermined receiving interval against predetermined data to determine the location of the robot with respect to the boundary. The boundary, may be, for example, defined by a perimeter wire loop that forms a closed pathway for signal generation and transmission, with a work area for the robot inside of the boundary.

The disclosed subject matter is directed to a method for determining the location of a robot with respect to a boundary. The method includes providing a robot. The robot includes at least one receiver for receiving a signal transmitted from a boundary, the transmitted signal including at least one positive pulse and at least one negative pulse within a predetermined period and transmitted at predetermined transmission intervals, for example, to define pulse trains while the signal is being transmitted. The robot also includes at least one detector electrically coupled to the receiver for detecting peaks in the signal. The method also includes detecting major peaks in the received signal corresponding to the time the signal is not being transmitted, and analyzing the data corresponding to the major peaks detected over a predetermined receiving interval against predetermined data, to determine the location of the robot with respect to the boundary. For example, the major peaks detected are major negative peaks, that are converted onto digital data.

BRIEF DESCRIPTION OF THE DRAWINGS

Attention is now directed to the drawings, where like numerals and/or characters indicate corresponding or like components. In the Drawings.

DETAILED DESCRIPTION

Figure 1:
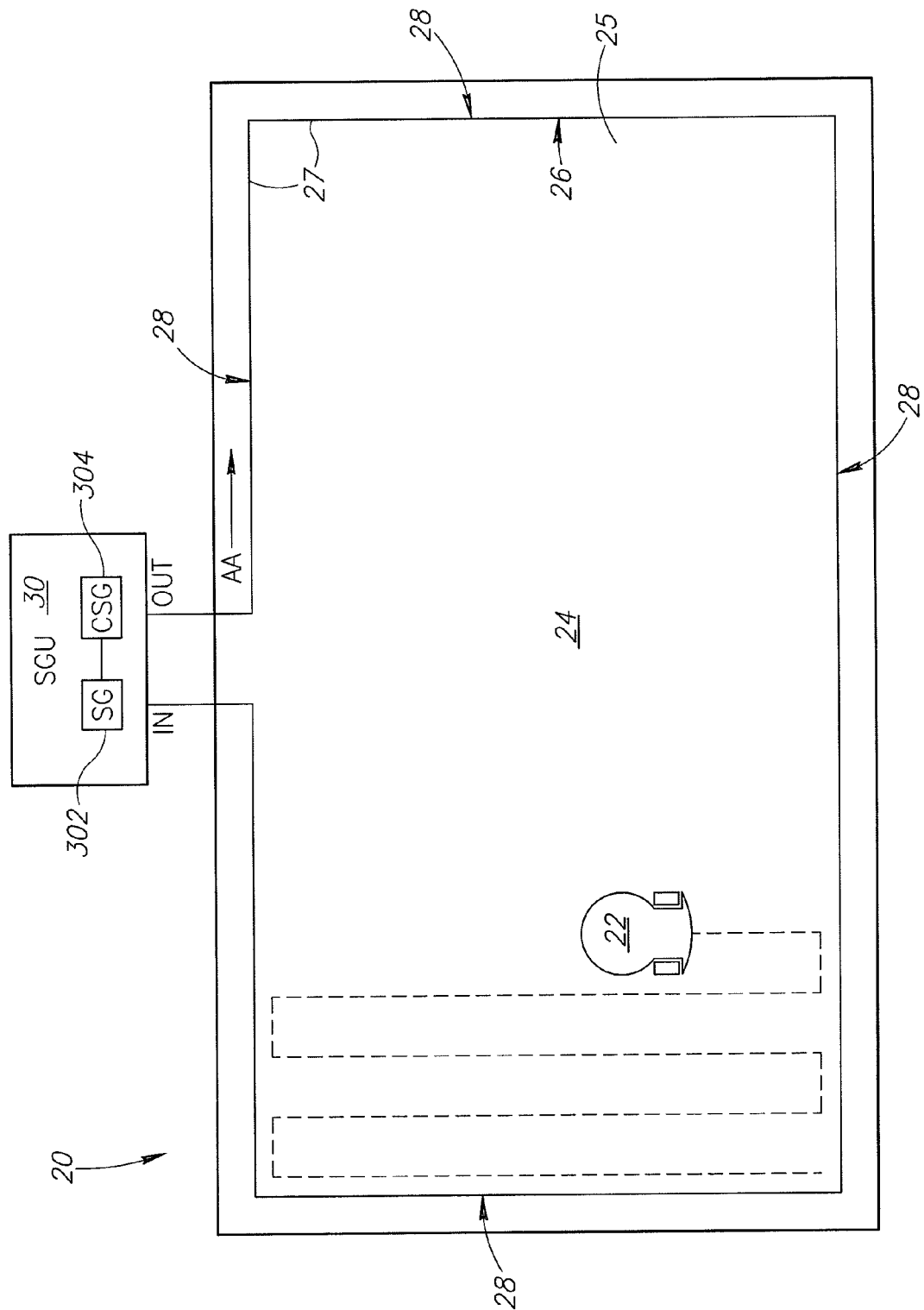
FIG. 1 is a diagram of the system in accordance with the disclosed subject matter.

Turning to FIG. 1, there is shown a system 20 that includes a robot 22, or other autonomous machine (machine), for example, a robotic lawnmower (robot and robotic lawnmower are used interchangeably in this document, with a robotic lawnmower being one type of robot or autonomous machine suitable for use in accordance with the disclosed subject matter), operating within a work area 24 or other bounded area, along a ground surface 25. The robot 22 is shown operating in a scanning pattern or "foot print", as shown in broken lines, that is programmed into the control unit 104, for example, the main board 150 in the microprocessor 150a thereof.

The work area 24 is defined by a boundary 26, formed, for example, of a wire 27 (a boundary marker) arranged around the perimeter of the work area to define a perimeter wire 28 or a perimeter wire loop (perimeter wire, perimeter wire loop, and perimeter loop used interchangeably herein). The wire 27 is proximate to the ground surface 25, but is usually buried in the ground.

The perimeter wire 28 is received in a signal generating unit 30. The signal generating unit 30 generates signals utilized by the robot 22 for multiple functions, in particular, to determine the specific location of the robot 22 within the work area 24 or outside of the work area 24, as detailed herein. The perimeter wire loop 28 defines a closed pathway over which the signal(s) generated by the signal generating unit 30 travel. Throughout this document, the terms "signal" and "signals" are used interchangeably when referring to the electromagnetic output (e.g., electromagnetic waveforms) generated by the signal generating unit (SGU) 30.

For example, the signal(s) output from the signal generating unit 30, and emitted through the perimeter wire 28 are, for example, low frequency electromagnetic signals, that induce magnetic fields. The robot 22 receives and detects these signals, and based on this receipt, robot location with respect to the work area 24, and sections of the work area 24 (if divided into such sections), is determined.

The wire 27 of the perimeter wire 28 is of metal or other electrically conductive metal wire. The wire 27 for the perimeter wire 28 may be for example, PERIMETER WIRE for the Robomower, MRK0014A, commercially available from Friendly Robotics (the trading name of the owner of this patent application) of Pardesyia 42815, Israel.

Figure 2:
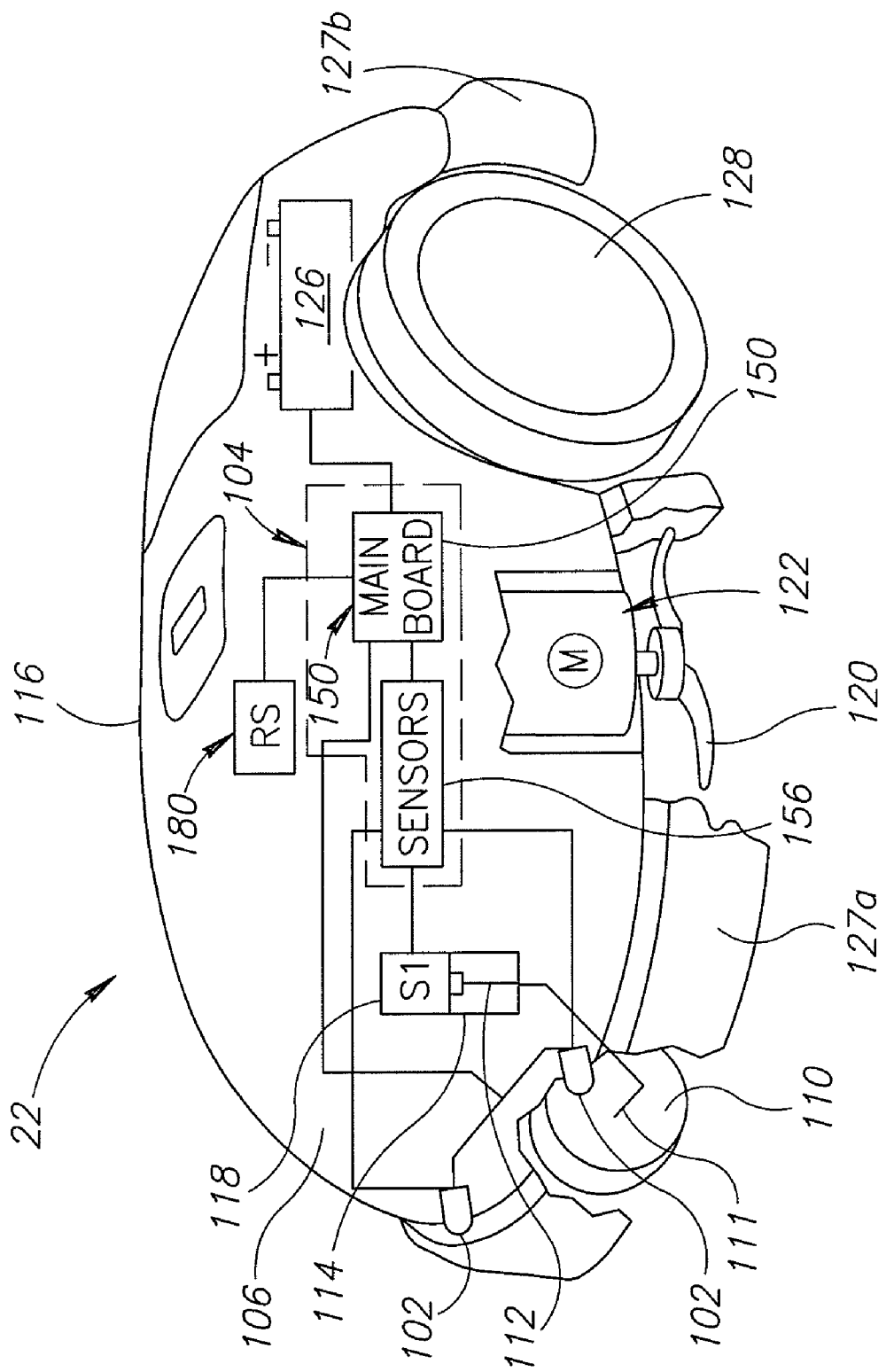
FIG. 2 is a perspective view with broken away sections of an exemplary robot for use with the system of the disclosed subject matter.
Figure 3:
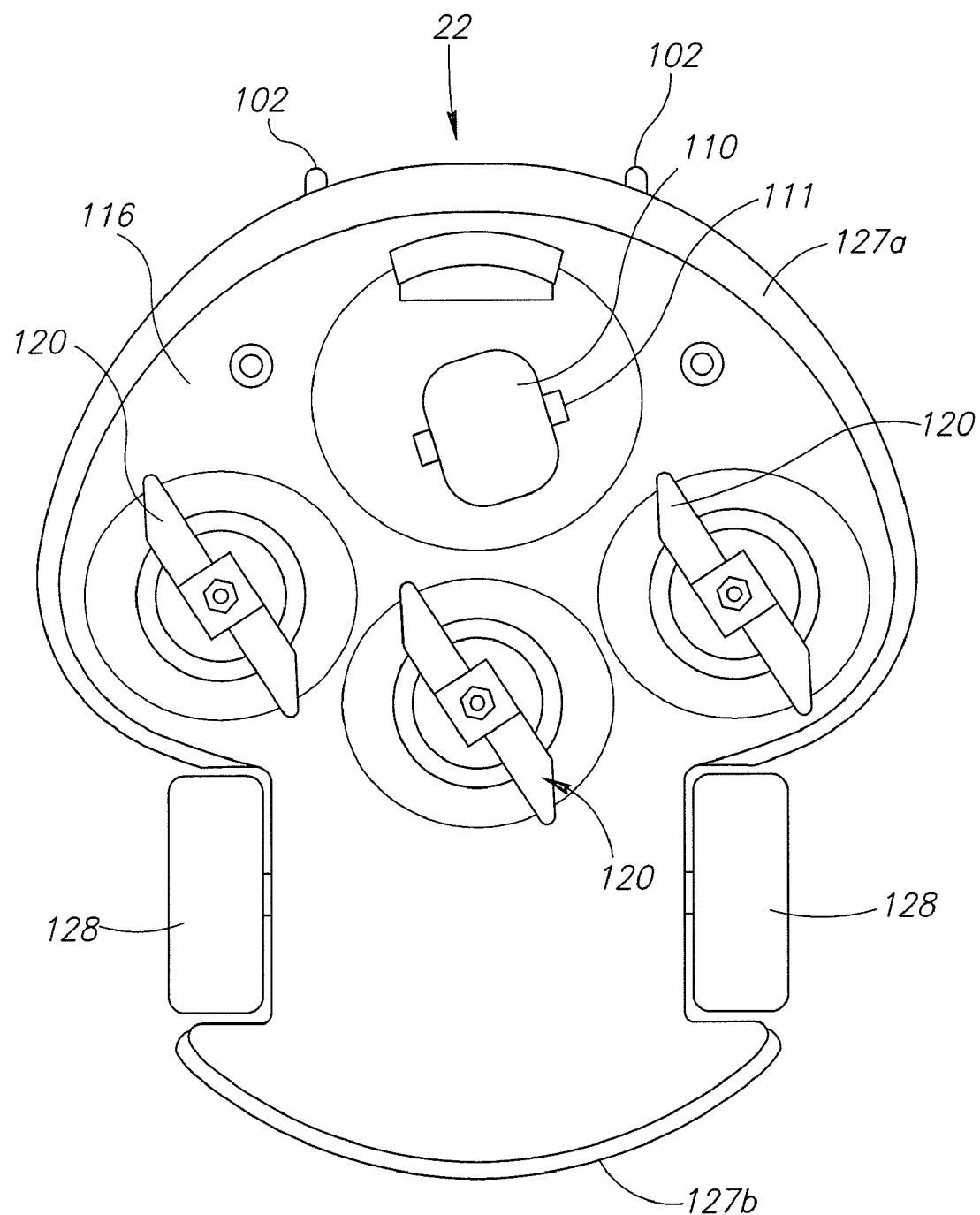
FIG. 3 is a bottom view of the robot of FIG. 2.
Figure 4:
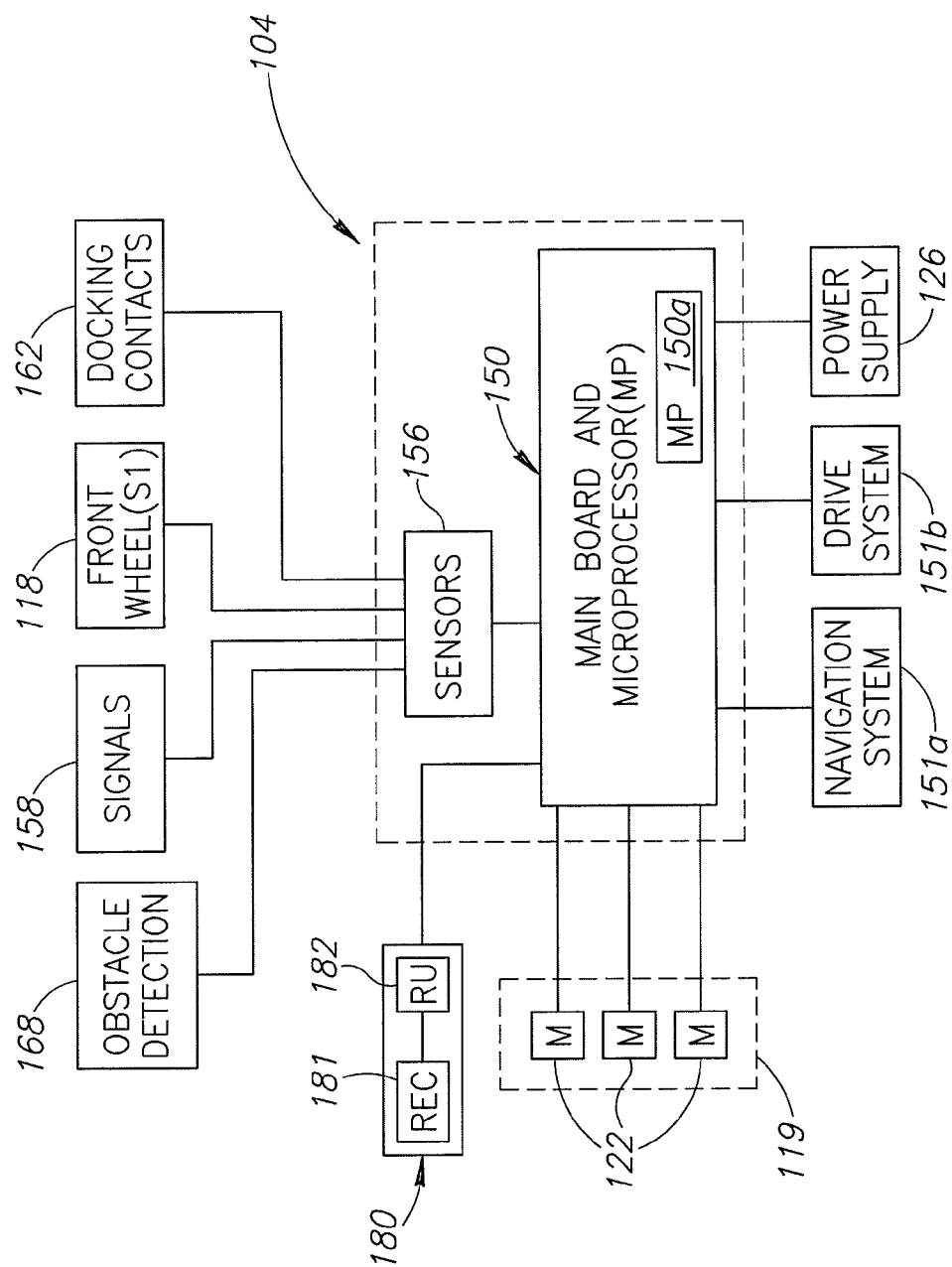
FIG. 4 is a block diagram of the operative structure of the robot of FIG. 2.
Figure 5A:
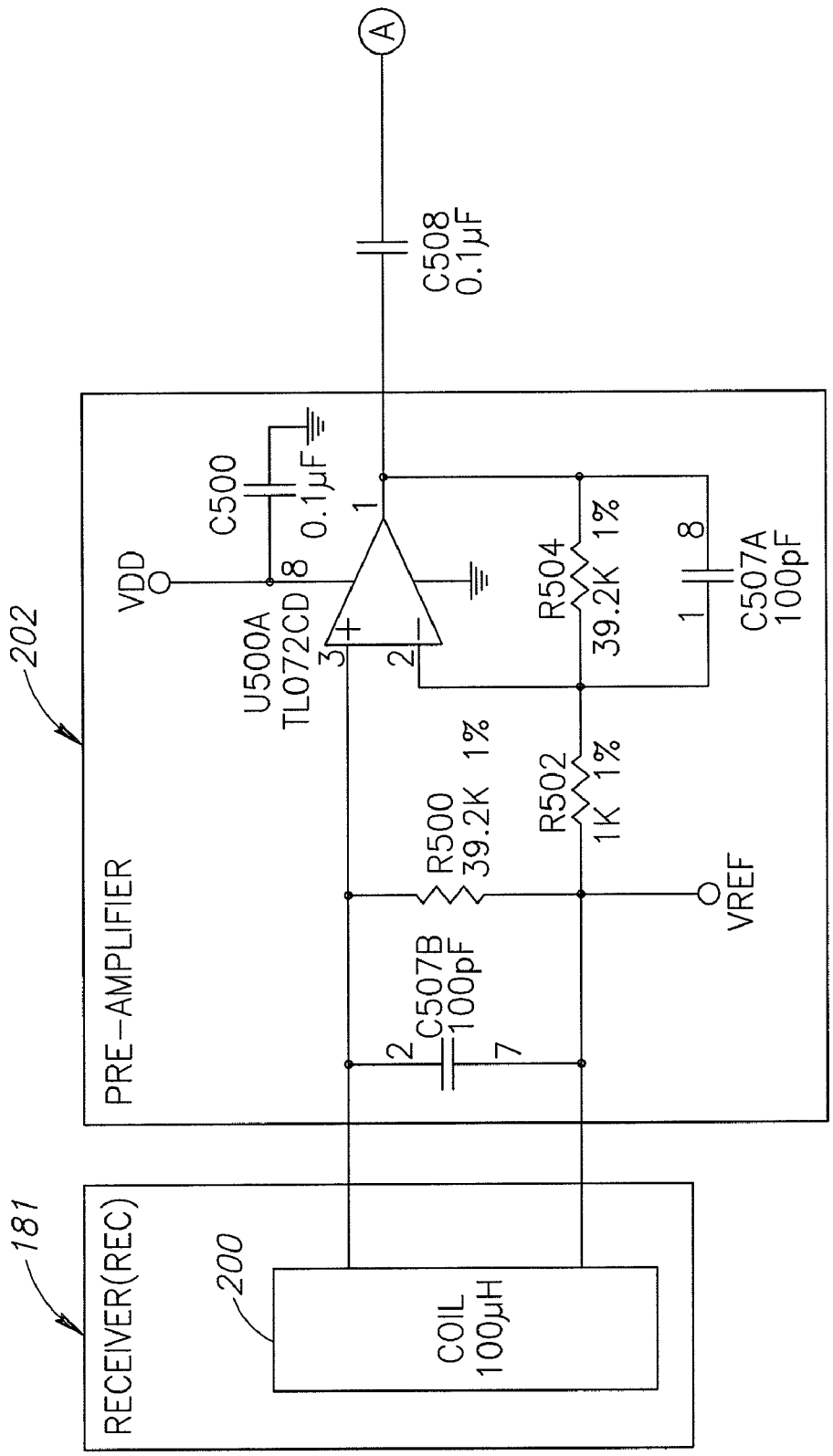
FIGS. 5A-5E form a schematic diagram of the receiver system of the robot of FIG. 2.
Figure 5B:
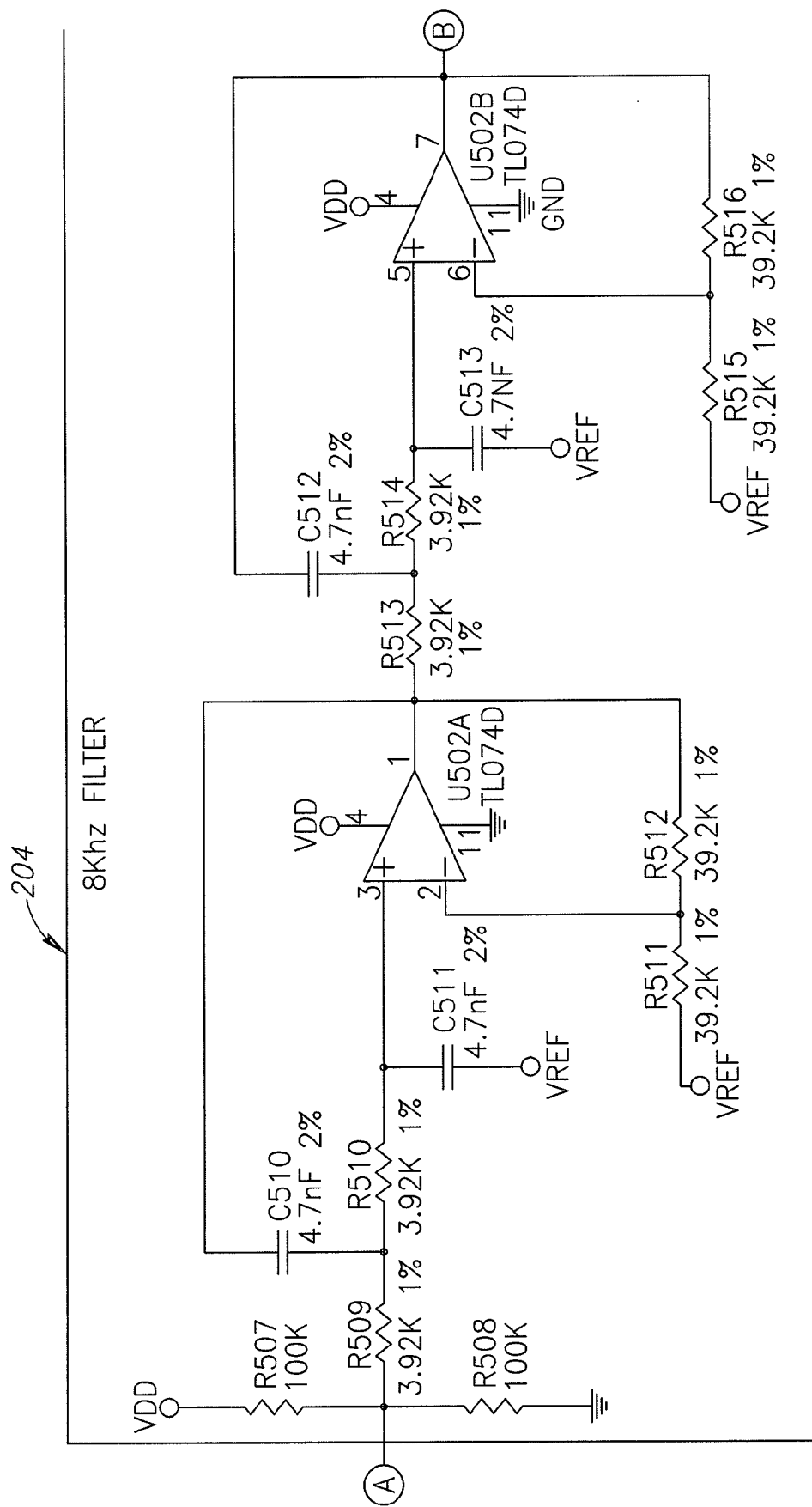
Figure 5C:
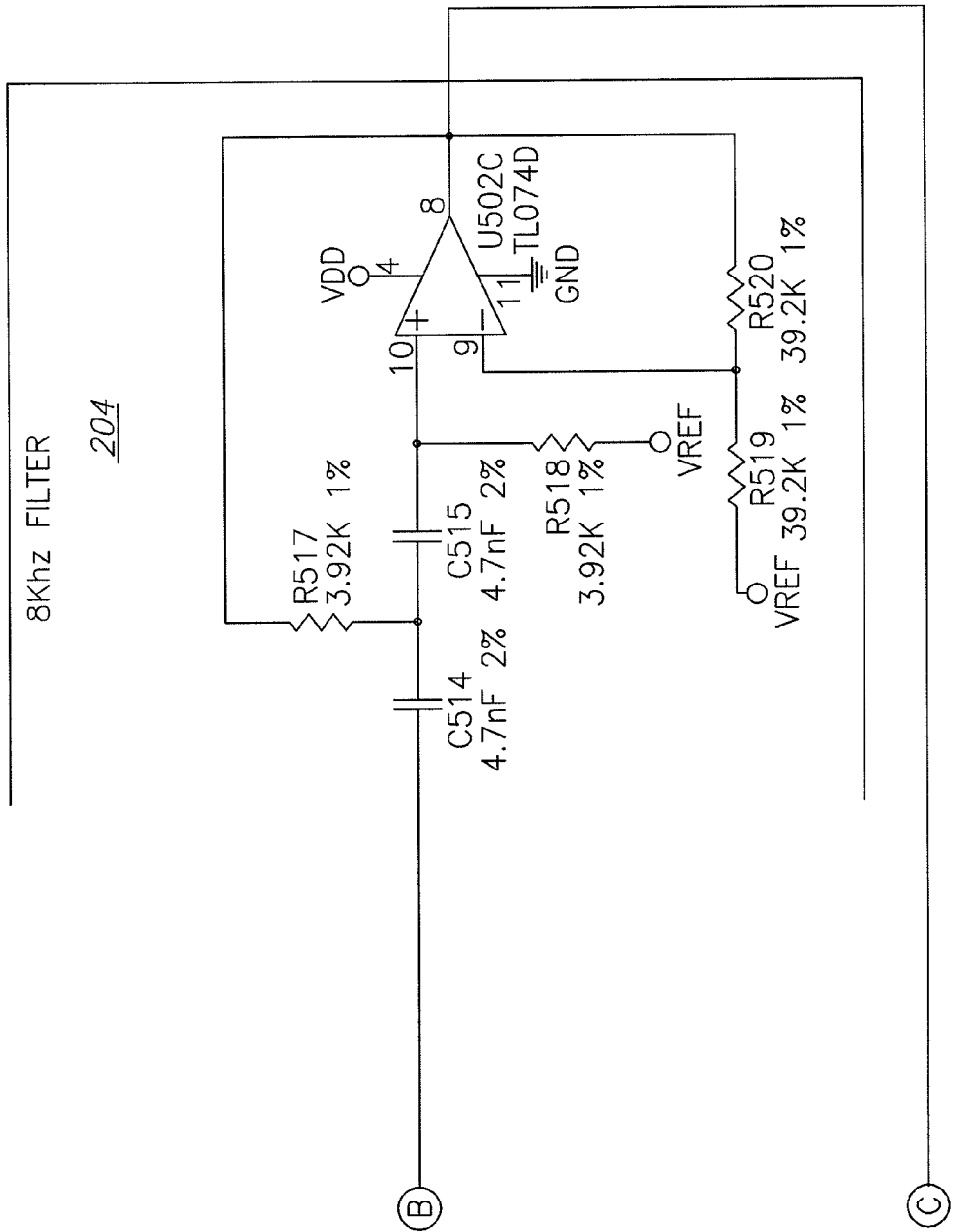
Figure 5D:
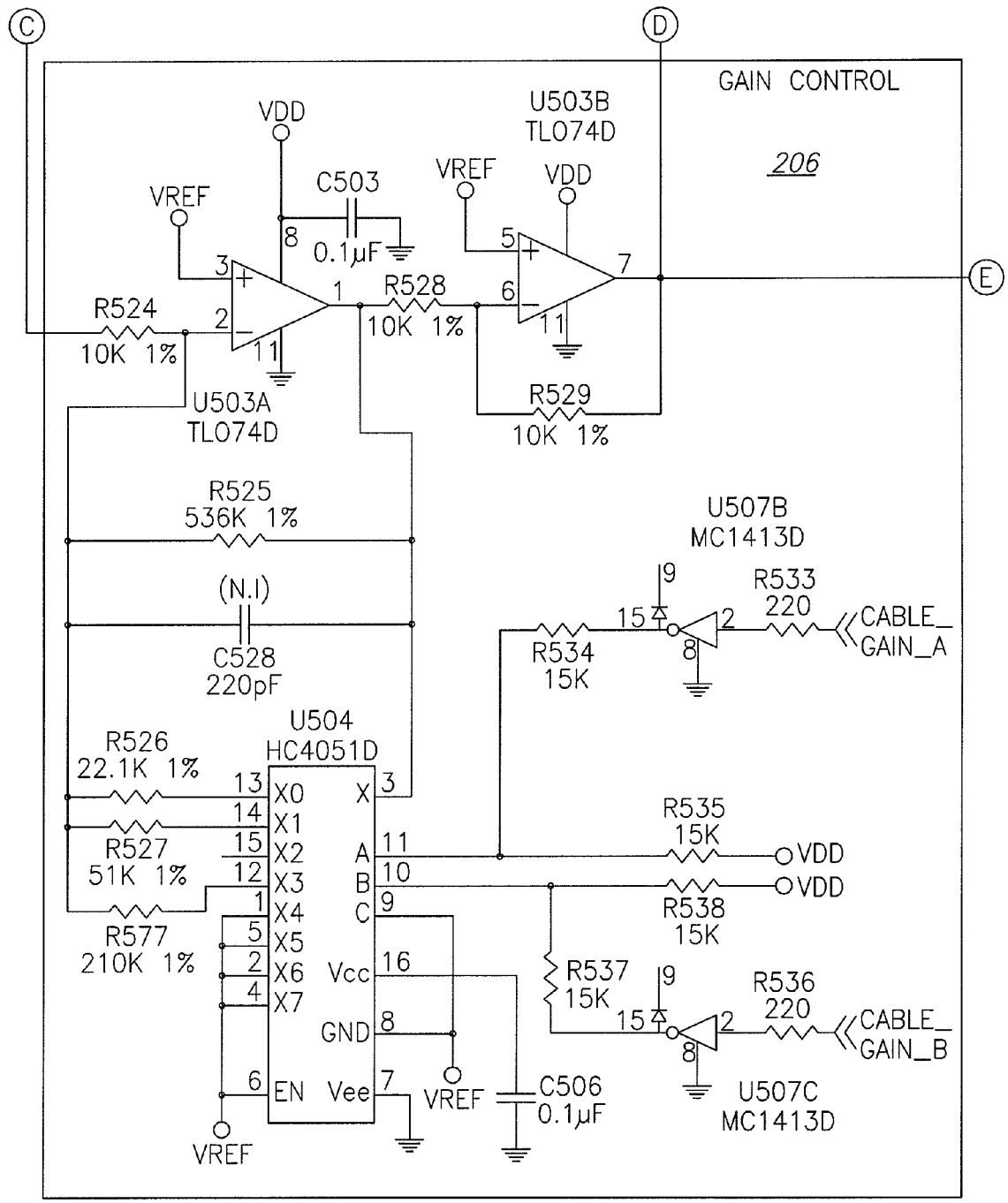
Figure 5E:
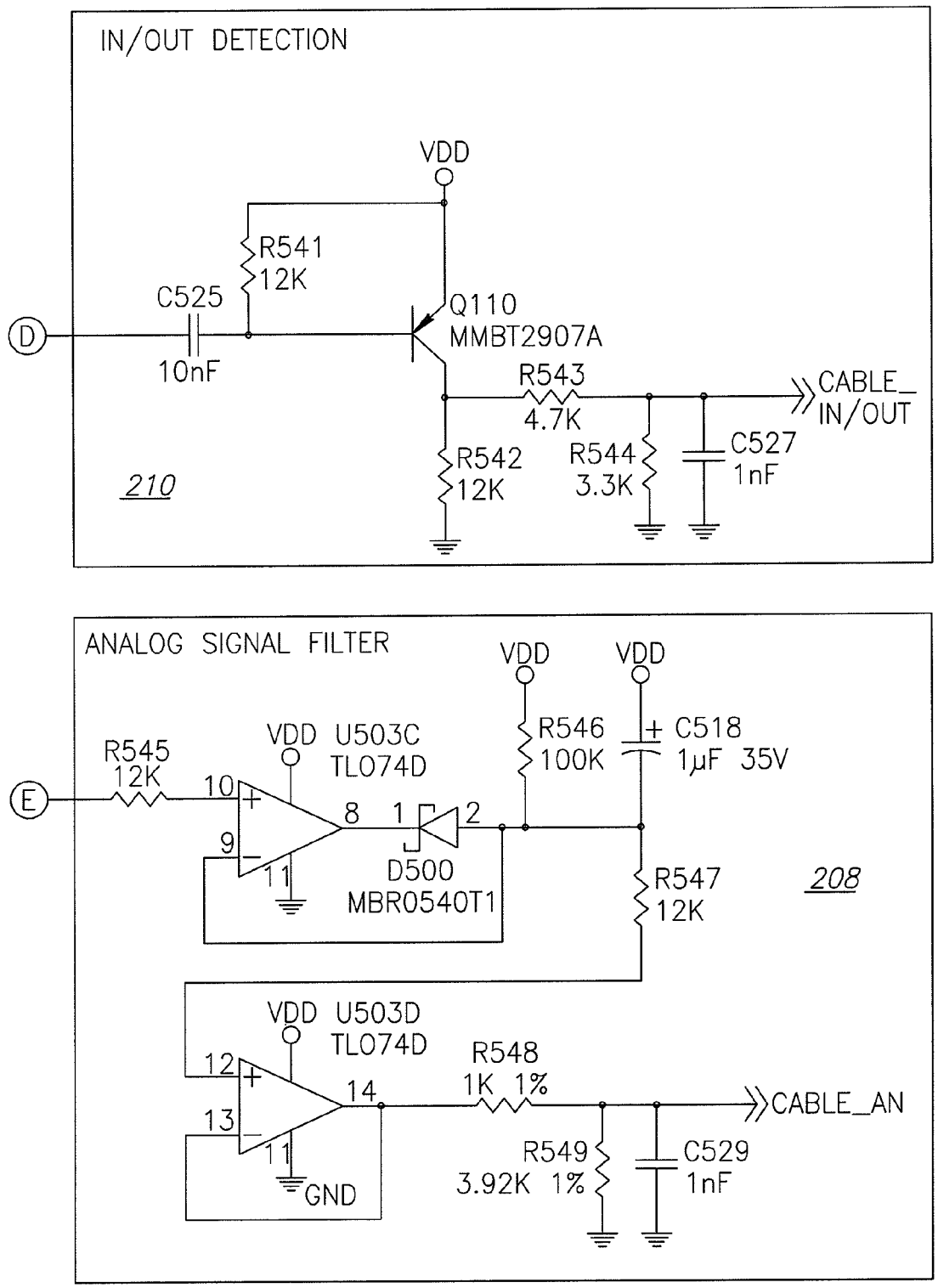

FIGS. 2-4 detail an exemplary robot 22 suitable for operation as part of the system 20. The robot 22 is shown is a robotic lawnmower, as its payload 119 (FIG. 4) is designed for lawn mowing. However, the robot 22 may have a payload 119 designed for numerous other functions, for example, vacuum cleaning, sweeping, snow and debris removal, and the like. The robot 22 is similar to the robot disclosed in commonly owned U.S. patent application Ser. No. 10/588,179, entitled: Robot Docking Station and Robot for Use Therewith, published as U.S. Patent Application Publication No. US 2007/0142964 A1, and PCT Patent Application No. PCT/IL05/00119 (WO 2005074362), all three of these documents and their disclosures incorporated by reference herein. U.S. patent application Ser. No. 10/588,179, U.S. Patent Application Publication No. US 2007/0142964 A1, are collectively referred to as U.S. patent application Ser. No. 10/588,179. The electronics of the robot are modified to include the receiver system 180, as detailed below, integrated with the control system for the respective robot. These modifications are described below.

The robot 22 includes docking contacts 102 (transmission parts for the transmission of energy, electricity, signals, or the like), extending forward or laterally from the front side 106 of the robot 22. The docking contacts 102 are typically parallel to the horizontal or ground surface. These docking contacts 102 protrude from the body 116 of the robot 22, and are described in detail in U.S. patent application Ser. No. 10/588,179 and PCT/IL05/00119.

There are typically two docking contacts 102, at the front (or front end) end of the robot 22, electronically linked (e.g., connected or coupled, as shown in broken lines) to the control system 104 of the robot 22, and the power supply 126 (batteries and associated components). This electrical linkage allows for charging of the power system (not shown) once a sufficient contact is made (as determined by the control system 104, for example, there is at least a threshold voltage of, for example, as least 25 Volts, on the docking contacts 102), that allows for docking between the robot 22 and a docking station (also known as a charging station) (when a docking station is present along the perimeter wire loop 28), or when the docking station 700 is off of the perimeter loop 28 as shown, for example, in FIG. 12. An exemplary docking station, suitable for use herewith, is the docking station disclosed in U.S. patent application Ser. No. 10/588,179 and PCT/IL05/00119, with minor modifications to accommodate the present disclosed subject matter.

The front wheel 110, whose axle 111 extends into a vertical rod section 112, is slideably mounted in a vertical orientation in a well 114 in the body 116 of the robot 22. Within the well 114 is a sensor (S1) 118, that detects wheel 110 position by detecting the position of the vertical rod section 112. The sensor (S1) 118 may be an electrical contact sensor, ultrasonic or light sensor, or any other position detecting sensor. The front wheel 110 of the robot 22, being slideably mounted in a vertical orientation, is such that when the axle 111/rod section 112, on which the front wheel 110 is mounted slides or drops downward to a predetermined level (also caused by lifting the body of the robot 20 at its front end), the rod section 112 is out of contact with the sensor (S1) 118, linked to the control system 104 (FIG. 4). As a result, the requisite components of the control system 104 signal the drive system 151*b* (FIG. 4) to stop movement of the robot 22.

The robot 22 also includes cutting blades 120 driven by motors (M) 122. It also includes and a power supply 126, for example, a battery, and front 127*a* and rear 127*b* bumpers, that if depressed will stop the drive system 151*b*, as detailed in U.S. Pat. No. 6,443,509, this document and its disclosure incorporated by reference herein. The front wheel 110 is passive (and typically has 360° movement), and the navigation system 151*a* and drive system 151*b* control the rear wheels 128, to move and steer the robot 22.

The control system 104 for the robot 22 is shown in FIG. 4, to which reference is now made. FIG. 4 is a block diagram showing the relationship of the components, but each of the components may be electrically linked or coupled to any other component, as would be known, for proper operation of the robot 22.

In FIG. 4, as well, the control system 104 includes a main board 150, and all electronics, as hardware, software and combinations thereof and other components, necessary for the robot 22 to perform all of its operations and functions (known as the main board electronics). The main board 150 includes one or more processors, and, for example, a microprocessor 150*a*, as part of the main board electronics.

A navigation system 151*a* is electrically coupled to the main board 150 and a drive system 151*b* is electrically coupled to the main board 150. The navigation system 151*a* and drive system 151*b* when combined define a movement system for the robot 22.

The navigation system 151*a* functions in the mapping operation and for directing the robot 22 inside the work area 24 based on its determined location and in accordance with the selected scanning pattern or operative mode, such as the "edge" mode, as detailed herein. The navigation system 151*a* also directs the robot 22 when outside of the work area. The navigation system 151*a* is programmable, for example, to allow for navigation in a work area 24 or the like in generally straight parallel lines, that are also substantially free of repetition. It is also programmable to other scanning patterns (for operation in the work or bounded area 24), such as saw tooth, random movement, or the like, useful in scanning a bounded area to provide coverage, and cutting over the entire work area with minimal repetition. The navigation system 151*a* works cooperatively with the drive system 151*b*, that controls the rear wheels 28 of the robot 22, to move the robot 22 along a desired course for its desired operation.

The motors (M) 122, power supply 126, and the various sensors described herein, represented by SENSORS 156, are also electrically coupled to the main board 150. Specifically the SENSORS 156 include electronics, known as "glue electronics" that connect the requisite sensors 118, 158, 162, 168 and any other sensors and the like to the microprocessor 150*a*. A receiver system (RS) 180 also electrically couples to the control system 104, for example, at the main board 150. The receiver system (RS) 180 receives and detects the perimeter signal(s) from the perimeter wire 28 of the signal generating unit 30. The receiver system 180 detects this signal(s) as being the boundary of the work area 24 or section thereof, in order to operate within the boundary of the work area 24 or section thereof, and work, for example in modes, such as the "edge" mode.

The receiver system 180 also functions to convert the received signal(s) into digital data. The control system 104, via the electronics of the main board 150, utilizes the digital data for robot operation.

The electronics of the main board 150, coupled with the navigation 151*a* and drive 151*b* systems, function, for example, in moving the robot 22 toward and back into the work area 24, including specific sections of the work area 24 (when the work area 24 is divided into sections, as shown for example, in FIGS. 10, 11 and 14 and detailed below), from outside the work area, mapping a work area or section thereof, and moving between sections of the work area. When a docking station is present along the perimeter wire loop 28, or off the perimeter wire 28 as detailed in FIG. 12 and discussed below, the electronics of the main board 150 (including the microprocessor 150*a*) are programmed to cause the robot 22 to, move toward the docking station, dock in the docking station, perform the docking operations associated therewith, as detailed in U.S. patent application Ser. No. 10/588,179 and PCT/IL05/00119, and other functions associated with robot 22 operation.

Figure 12:
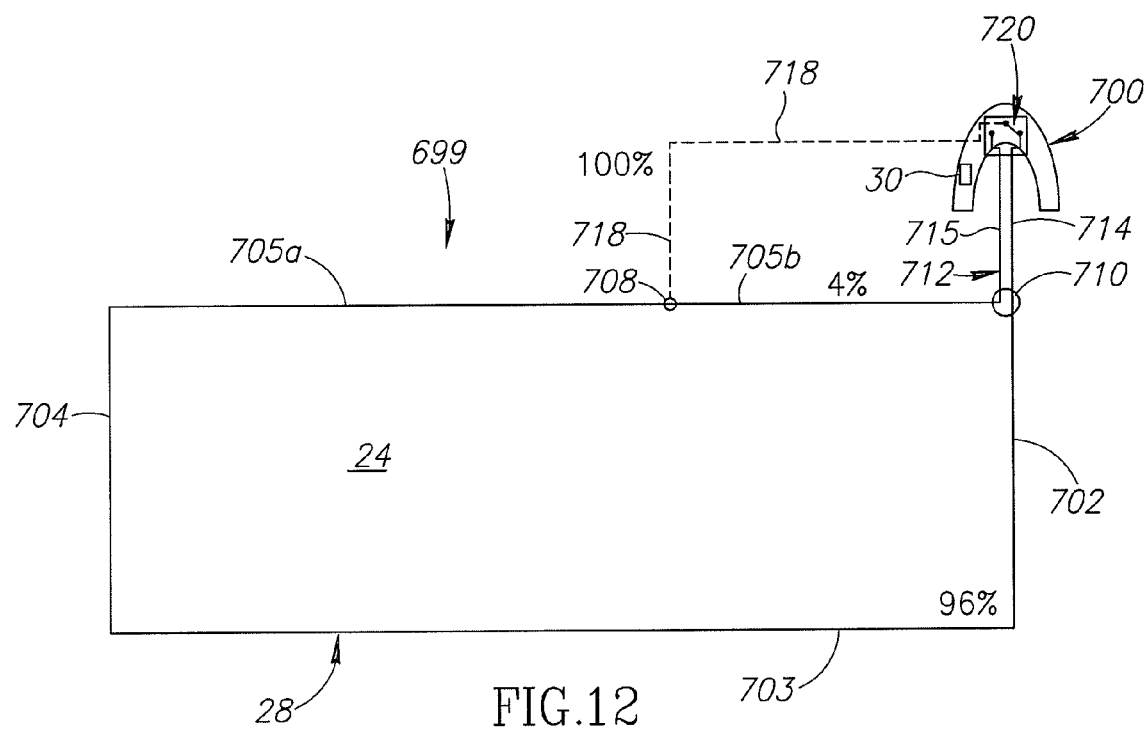
FIG. 12 is a diagram of a system having an off perimeter charging station.

The main board electronics are also programmable, such that when the robot 22 is operating with a docking station 700 (FIG. 12) along the perimeter loop 28, or off of the perimeter loop 28, as shown in FIG. 12 and detailed below, the robot 22 will move toward the perimeter loop 28 to detect the perimeter signal and ultimately move toward the docking station upon detection of a docking event. Example docking events occur when: 1) robot operation is complete (the area within the boundary marker 28, the work area 24, has been worked); 2) the battery voltage in the robot 22 reaches (drops to) a predetermined threshold; 3) a predetermined time for robot operation has expired; or 4) a problem in the robot 22 itself is detected. With a docking event detected, the main board electronics are then programmed, for example, by mapping or the like, to cause the robot 22 to move toward the docking station 700 along the perimeter wire 28, also as detailed in U.S. patent application Ser. No. 10/588,179 and PCT/IL05/00119.

Alternately, the robot 22 maps the boundary 26 by detecting the perimeter wire 28 and the proximity thereto. This mapping and detection is performed by the navigation system 151*a* and electronics of the main board 150 (main board electronics), as the robot 22 traverses the perimeter wire 28 and maps the work area 24, by noting its coordinates, as detailed in commonly owned U.S. Pat. No. 6,255,793, or in accordance with navigation and detection methods disclosed in commonly owned U.S. Pat. No. 6,615,108. U.S. Pat. No. 6,255,793 and U.S. Pat. No. 6,615,108 and their disclosures are incorporated by reference herein.

When a docking station is present along the perimeter wire 28, the robot 22 notes the position of the docking station as part of its mapping, as detailed in U.S. patent application Ser. No. 10/588,179 and PCT IL/05/00119. For example, the electronics of the main bard 150 of the robot 22, are programmed to detect the position of the docking station along the perimeter wire 28 during its mapping operation or upon its initial placement in the docking station 700 (FIG. 12), in both on the perimeter and off of the perimeter arrangements, and return to the docking station 700, along at least a portion of the perimeter wire 28 or wire path, when the docking station 700 is off of the perimeter wire 28, as shown for example, in FIG. 12. Also, as detailed below, with the signal from the perimeter wire 28 detected by the robot 22, as detailed below, the navigation 151a and drive 151b systems of the robot 22 can be coordinated, and controlled by the electronics of the main board 150, to move the robot 22 to the docking station 700 (traveling along at least a portion of the perimeter wire 28). This may be, for example, in response to a docking event, detected by the electronics of the main board 150.

The electronics of the main board 150 (main board electronics) control operation of the robot 22 in various modes, such as an "edge" mode, where the robot 22 moves following the perimeter wire 28, by detecting a perimeter signal in the perimeter wire 28. This may occur, for example, after the robot 22 has worked the work area 24 within the perimeter wire 28. An exemplary edge mode is described in commonly owned U.S. Pat. No. 6,493,613. U.S. Pat. No. 6,493,613 and its disclosure is incorporated by reference herein.

Alternately, the payload 119 could be replaced with any other payload, such as one for vacuuming, sweeping, and the like.

The docking contacts 102, the front wheel sensor (S1) 118, and various signal transmitters and receivers (the actual signals detailed below), represented by SIGNALS 158, also electrically couple to the SENSORS 156. For example, the robot 22, via the main board 150, can determine that it is in the docking station when the docking contacts 102 when carrying a voltage of approximately 25 volts or greater. The docking contacts 102 are also electrically coupled to the power supply 126, either directly, or through the main board 150, in order to provide recharging of the power supply 126, when the robot 22 is docked in the docking station.

Sensors, for example, voltage sensors on the docking contacts 162, are also electrically coupled to the SENSORS 156. There are also obstacle sensors 168, that are electrically coupled to the SENSORS 156.

The receiver system (RS) 180 is positioned on the robot 22 to detect the signal(s) being generated by the signal generator 30, along any point in the perimeter wire 28. The receiver system (RS) 180 includes a receiver (REC) 181 that is electrically coupled to a receiver unit (RU) 182. The receiver system (RS) 180 is electrically coupled to the control system 104, for example, to the main board 150, where data sent from the receiver system 180 is analyzed, the analysis including the determination of robot location with respect to the perimeter loop 28. The electronics of the main board 150 cause various operations of the robot 22 in response to the analyzed data (for robot location).

The receiver system (RS) 180 is shown separate from the control unit 104 of the robot 22, but may be part of the control unit 104. Alternately, the receiver unit (RU) 182 may be a stand alone component, with respect to the control system 104 of the robot 22, or, for example, the receiver unit may be integrated into the main board 150. The receiver 181 is designed to receive the signal(s), for example, the magnetic signal(s) induced by the perimeter wire/loop 28 and the receiver unit (RU) 182 is designed to evaluate parameters including, for example, 1) an amplitude inversely proportional to the distance of the receiver 181 (receiver coil 200) from the perimeter wire/loop, as well as, 2) the state of whether the receiver (receiver coil 200) is inside or outside the work area, as defined by the perimeter loop 28. The magnetic signal is detected as an analog signal and converted to a digital representation, for example, a pulse. The receiver 182 detects the signals induced by the perimeter wire loop as an analog signals and converts the analog signal(s) to digital pulses. The microprocessor 150a of the control unit 104, counts the digital pulses to determine the location of the robot 22 inside or outside of the work area 24 or section thereof. This location information is then analyzed by the microprocessor 150a that signals the main board electronics, to cause the drive system 151b, and when necessary, also the navigation system 151a, to move the robot 22 accordingly.

FIGS. 5A-5E, collectively referred to hereinafter as FIG. 5, to which attention is now directed, shows the receiver 181 and the receiver unit 182 of the receiver system 180 in detail, in a schematic (circuit) diagram. The receiver 181 and the receiver unit 182 are is coordinated, for example, by being at compatible frequencies, with the signal generating unit 30, in order to determine robot 22 location as detailed below. The receiver unit 182 is, for example, formed of multiple components and/or circuits. The elements of each component or circuit, as shown in FIG. 5, when not specifically described by manufacturer code in Table 1 below include common circuit elements such as resistors (R) and capacitors (C), that are available from numerous component manufacturers and suppliers. The schematic diagram of FIG. 5 is in accordance with standard conventions for electronic circuits. A catalog of the major elements of the aforementioned circuits, that form the receiver unit 182 is as follows from Table 1.

TABLE 1

| COMPONENT NUMBER FROM FIGS. 5A-5E (FIG. 5) | COMPONENT | DESCRIPTION | MFGR. CODE |
|---|---|---|---|
| Preamplifier 202 | | | |
| C500 | Capacitor | 0.1 µF (micro Farads) | |
| C507A, C507B | Capacitor | 100 pico Farads (pF) | |
| R500, R504 | Resistor | 39.2 Kilo(K) Ohms 1% | |
| R502 | Resistor | 1K Ohm 1% | |
| U500A | Amplifier | Low Noise Operational Amplifier | TL072CD |
| Filtration Circuitry 204 | | | |
| R507, R508 | Resistor | 100K Ohms | |
| R509, R510, R513, R514, R517, R518 | Resistor | 3.92K Ohms 1% | |
| C510, C511, C512, C513, C514, C515 | Capacitor | 4.7 nano Farads (nF) 2% | |
| U502A, U502B, U502C | Amplifier | Quad Low Noise Amplifier | TL074D |
| R511, R512, R515, R516, R519, R520 | Resistor | 39.2K Ohms 1% | |

TABLE 1-continued

| COMPONENT NUMBER FROM FIGS. 5A-5E (FIG. 5) | COMPONENT | DESCRIPTION | MFGR. CODE |
|---|---|---|---|
| Gain Control Circuitry 206 | | | |
| R524, R528, R529 | Resistor | 10K Ohms 1% | |
| R525 | Resistor | 536K Ohms | |
| R526 | Resistor | 22.1K Ohms 1% | |
| R527 | Resistor | 51K Ohms 1% | |
| R533, R536 | Resistor | 220K Ohms | |
| R534, R535, R537, R538 | Resistor | 15K Ohms | |
| R577 | Resistor | 210K Ohms 1% | |
| C503, C506 | Capacitor | 0.1 µF | |
| C528 | Capacitor | 220 pF | |
| U503A, U503B | Amplifier | Low Noise Operational Amplifier | TL074D |
| U504 | Analog multiplexer | 8 Channel Analog Multiplexer | HC4051D |
| U507B, U507C | Inverter | Darlington Transistor Array | MC1413D |
| Analog Signal Filter 208 | | | |
| R545, R547 | Resistor | 12K Ohms | |
| R546 | Resistor | 100K Ohms | |
| R548 | Resistor | 1K Ohms 1% | |
| R549 | Resistor | 3.92K Ohms 1% | |
| C518 | Capacitor | 1 µF 35 Volts (V) | |
| C529 | Capacitor | 1 nF | |
| U503C, U503D | Amplifier | Low Noise Operational Amplifier | TL074D |
| D500 | Schottky Diode | | MBR0540T1 |
| IN/OUT Detector 210 | | | |
| C525 | Capacitor | 10 nF | |
| C527 | Capacitor | 1 nF | |
| R543 | Resistor | 4.7K Ohms | |
| R541, R542 | Resistor | 12K Ohms | |
| R544 | Resistor | 3.3K Ohms | |
| Q110 | Transistor | | MMBT2907A |
| Additional Components from Receiver Unit 182 | | | |
| C508 | Capacitor | 0.1 µF | |

The receiver (REC) 181 includes a coil 200 (also known as a receiver coil), electrically coupled (for example, electrically connected) to a preamplifier 202, that is electrically coupled (for example, electrically connected) to filter circuitry 204. The filter circuitry 204 is electrically coupled (for example, electrically connected) to gain control circuitry 206, that is electrically coupled (for example, electrically connected) to an analog signal filter 208 and (robot) In/Out location detection circuitry 210 (also known as a detector for detecting robot location with respect to the perimeter loop 28), whose output is at CABLE_IN/OUT.

The coil (receiver coil) 200 is, for example, a 100 micro Henry coil, for receiving the signal from the perimeter wire loop 28. While a single coil 200 is shown, multiple coils may also be used. The received signal is then passed to the receiver unit 182. The received signal is amplified in the preamplifier 202. The preamplified signal is then subject to filtration in the filtration circuitry 204, that is for example, an 8 KHz filter, so as to be coordinated with the frequency of the signal(s) being generated by the signal generating unit 30 (for example, the frequency of the signal generated by the signal generating unit 30 is, for example, a 4 KHz signal with a 25% duty cycle, such that the 8 KHz harmonics of the signal pass through the filtration circuitry 204. The filtration circuitry 204 may be at any other frequency, provided it is synchronized with the frequency of the signal(s) being generated by the signal generating unit 30.

The selectable gain control circuitry 206 is for amplifying the signal(s) to ensure an optimal operation of the In/Out detection circuit 210 that follows. From the gain control circuitry 206, the signal(s) is/are fed into the analog signal filter 208, that creates a signal CABLE_AN. The signal CABLE_AN is proportional to the amplitude of the signal received in the coil 200 (and is inversely proportional to the distance of the coil 200 from the perimeter loop 28).

The signal is passed to the In/Out detector circuit 210. The In/Out detector circuit 210 detects major peaks, positive or negative (for example, positive being above the zero lines and negative being below the zero lines in FIG. 9), depending on the current direction through the perimeter loop 28 from all other minor peaks in the signal. The threshold for a major peak as distinguished from all minor peaks programmed or programmable into the In/Out Detector circuit 210.

For example, based on the current direction through the perimeter loop 28 being clockwise, as detailed herein, the In/Out detector circuit 210 is, for example, a single transistor negative peak detector Q110, that detects the major negative peaks from the minor negative peaks. Conversely, in alternate embodiments, with the current flowing through the perimeter loop 28 in the counterclockwise direction (opposite arrow AA in FIG. 1), the receiver unit 182 would be modified slightly, for example, in the IN/Out Detector Circuit 210 such that transistor Q110 would be an NPN transistor and the positions of VDD and GND (proximate resistor R542) would be reversed. This would allow the In/Out detector 210 to function as a single transistor positive peak detector, detecting positive major peaks, similar to that for the major negative peaks, as detailed below.

This circuit 210 and its surrounding components, gives a positive pulse at the CABLE_IN/OUT port, each time a negative major peak is detected in the received signal. The major negative peaks in the received signals are shown, for example, by, points 505 and 506, respectively in the signal representations 501a, 502a in FIG. 9, detailed further below. The minor peaks, for example, minor negative peaks are points 507 in the signal representation 501a in FIG. 9. (The signal representation 502a has positive minor peaks 508). The PN junction of the transistor Q110, together with the capacitor C525 and a resistor R541 (FIG. 5) functions as a clamping circuit. Adjusting the time constant resulting from the resistance of R541 multiplied by capacitance of C525, allows for the rejection of the lower amplitude, minor negative peaks 507, resulting in pulses, represented by lines 501b and 502b (the specific pulses corresponding to the major negative peaks 505, 506 indicated as 501bx and 502bx, respectively), only derived from the higher amplitude, major negative peaks 505, 506.

Turning back to FIG. 1, the signal generating unit 30 includes a signal generator (SG) 302, electrically coupled with a controller (CSG) 304. The signal generator 302, is, for example, a low voltage a signal generator, that induces (produces) a signal (e.g., electromagnetic or the like) for the perimeter wire loop 28. This low voltage signal generator is, for example, controlled by the controller 304, that is, for example, processor based. The controller 304 is, for example, a processor, such as a microprocessor, programmable or preprogrammed for its signal generating operations.

Figure 6:
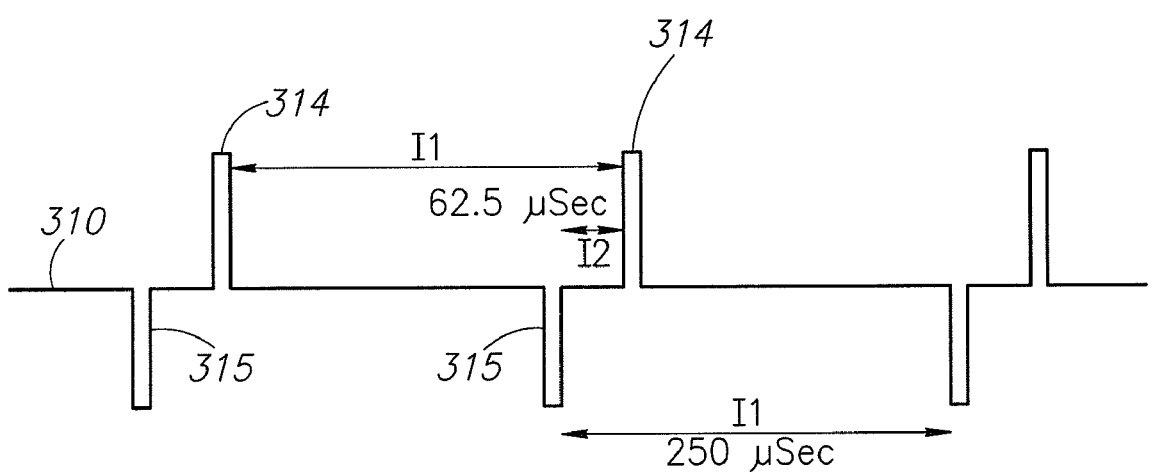
FIG. 6 is a diagram of a waveform generated by the signal generating unit of the system of FIG. 1.

The signal generator 302, for example, drives a bi-polar square signal to the perimeter wire 28 (either by circuit components or by a microprocessor in the controller 304 typically as programmed therein). An exemplary bi-polar square signal is shown as represented by line 310 in FIG. 6. For example, the signal, represented by the line 310, is a unique signal, with the distance between consecutive positive pulses 314 and consecutive negative pulses 315 at intervals, also known as periods (for the signal(s)), of approximately 250 microseconds (the interval or period represented by the double headed arrow I1), while the distance between a negative pulse 314, followed by a positive pulse 314 of approximately 62.5 microseconds (being represented by the double headed arrow I2). The current in the perimeter wire loop 28 resulting from this unique signal (represented by the line 310) is detailed below.

Expressed generally, in terms of variables for the unique signal above, as represented by the line 310, a positive and a negative pulse are spaced by a time period "TP" with an interval or frame being "4TP". Accordingly, filtration of this signal is performed with a filter of a frequency "F" of "1/(2·TP)".

Figure 7A:
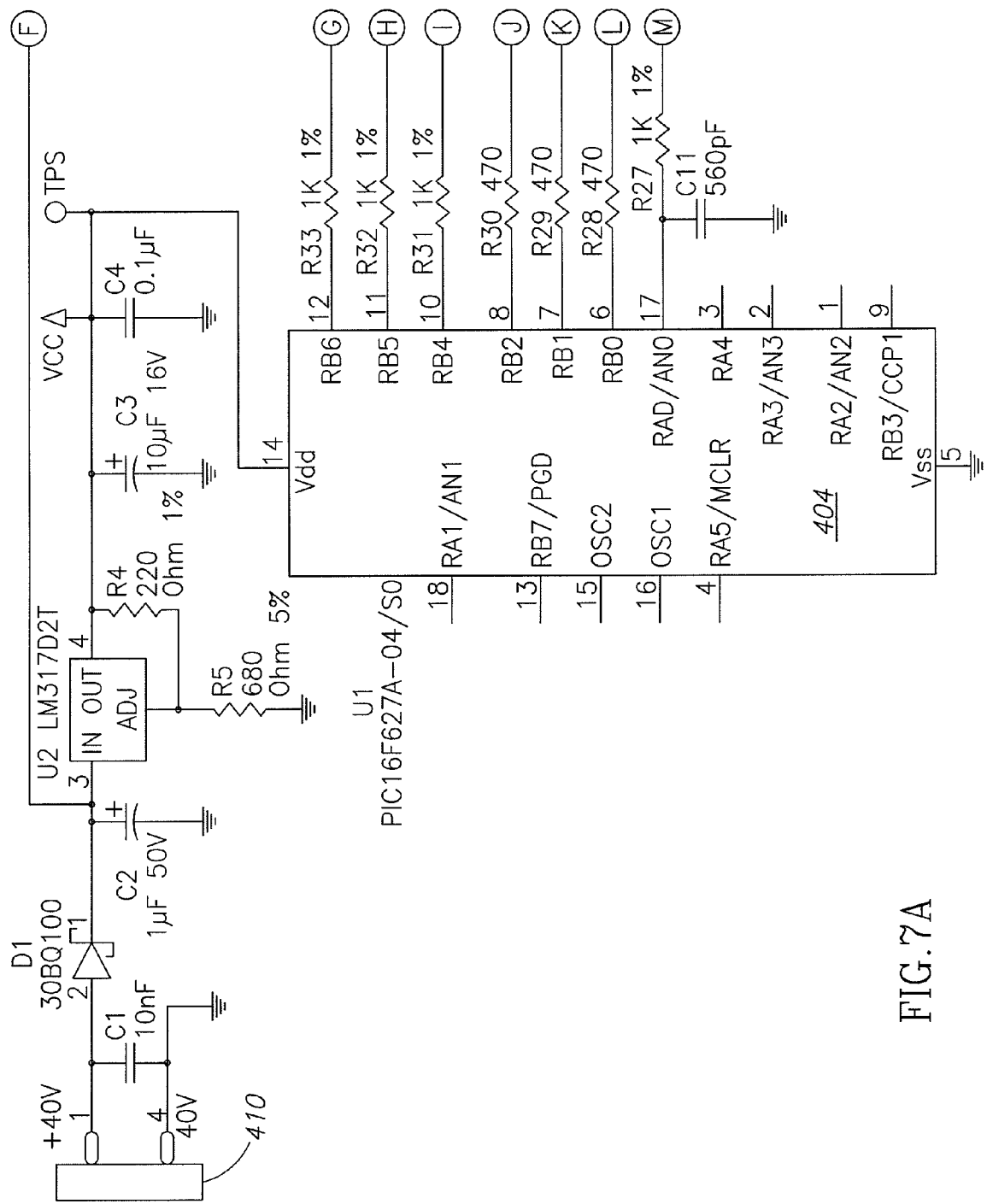
FIG. 7A-7C form a schematic diagram of the signal generating unit of FIG. 1.
Figure 7B:
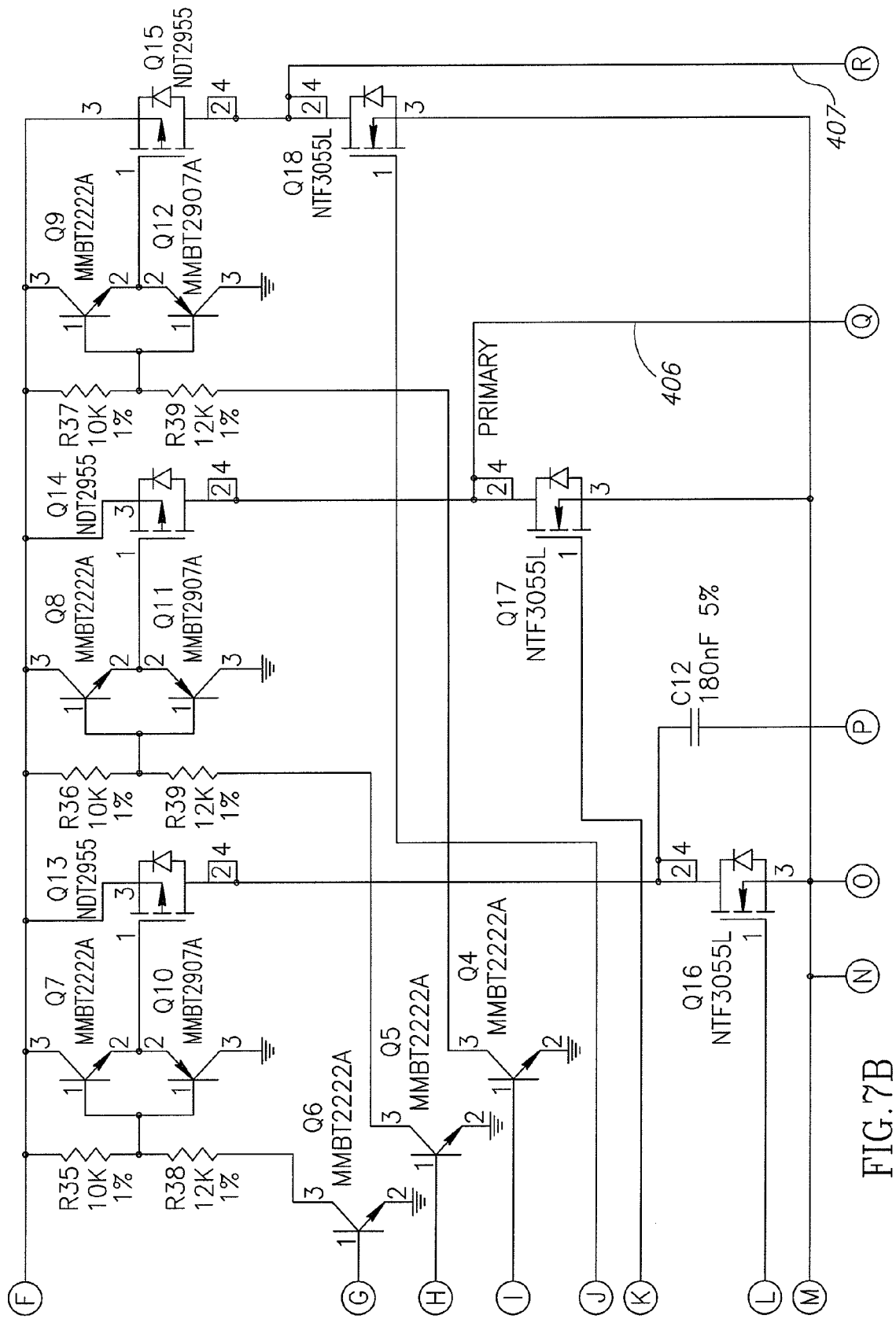
Figure 7C:
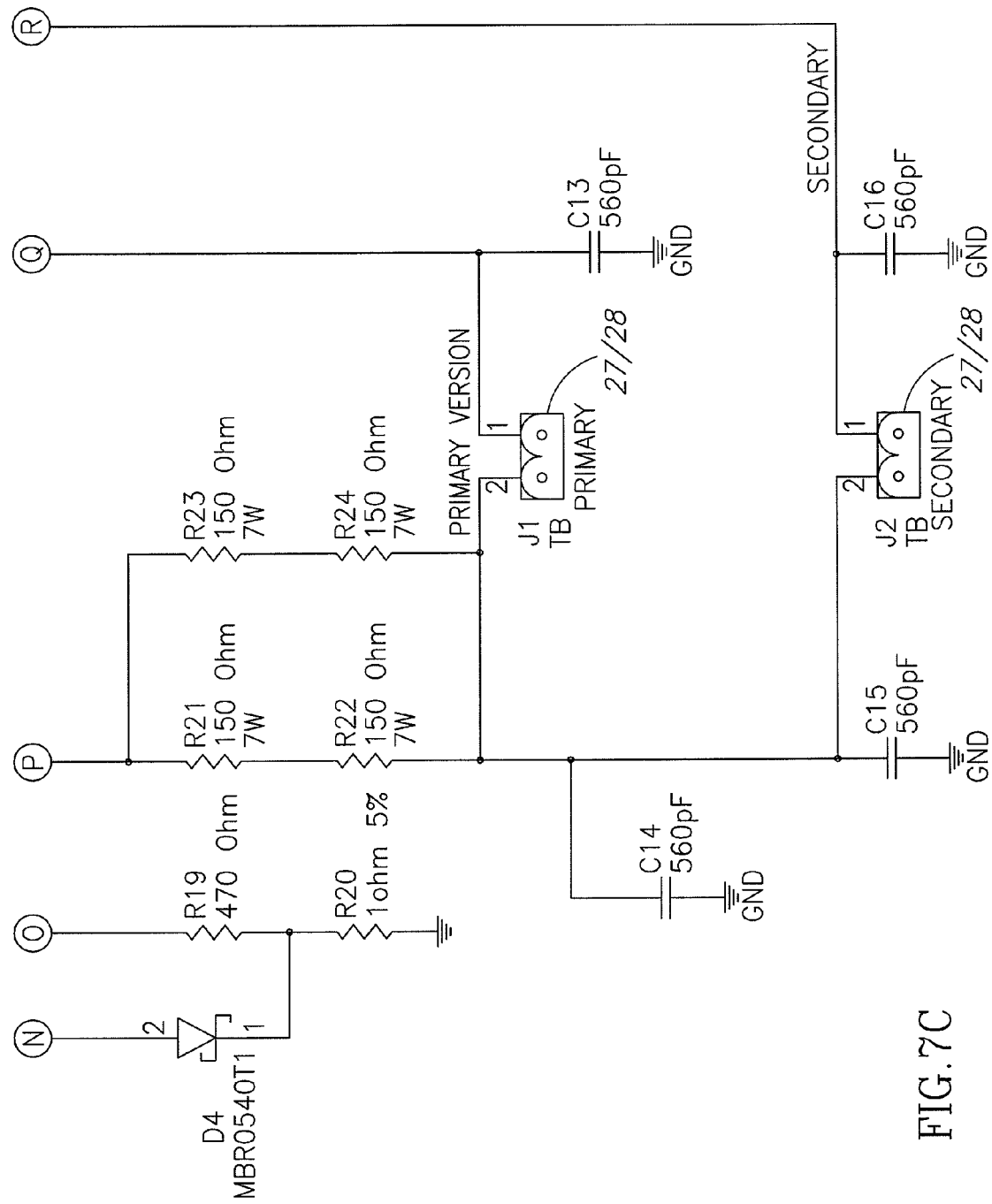

An exemplary signal generator 302 for the signal generating unit 30 is shown in FIG. 7A-7C, collectively referred to hereinafter as FIG. 7. The elements of each component or circuit, as shown in FIG. 7, when not specifically described by manufacturer code in Table 2 below, include common circuit elements such as resistors (R) and capacitors (C), that are available from numerous component manufacturers and suppliers. The schematic diagram of FIG. 7 is in accordance with standard conventions for electronic circuits. A catalog of the major elements of the aforementioned circuits, that form the signal generator 302 of the signal generating unit 30 is as follows from Table 2.

The above-mentioned H-Bridge drives the perimeter wire loop 28 (wire 27) (connected to the H-Bridge at J1) through the capacitor C12 (180 nano farad) and resistors R21-R24 (which creates an equivalent resistance of 150 ohm). The resistors R21-R24 regulate the current on the loop (so it can be approximately the same, regardless of the perimeter wire length) as well as compensate for the influence of the inductance of the perimeter wire 28 (which can become dominant in long wires). The H-bridge high-side is connected to a 40V power-supply 410. This power supply 410 may be another voltage, based on the current desired on the perimeter wire 28, to create a signal with a peak current amplitude of about ±200 milli Amperes.

Figure 8:
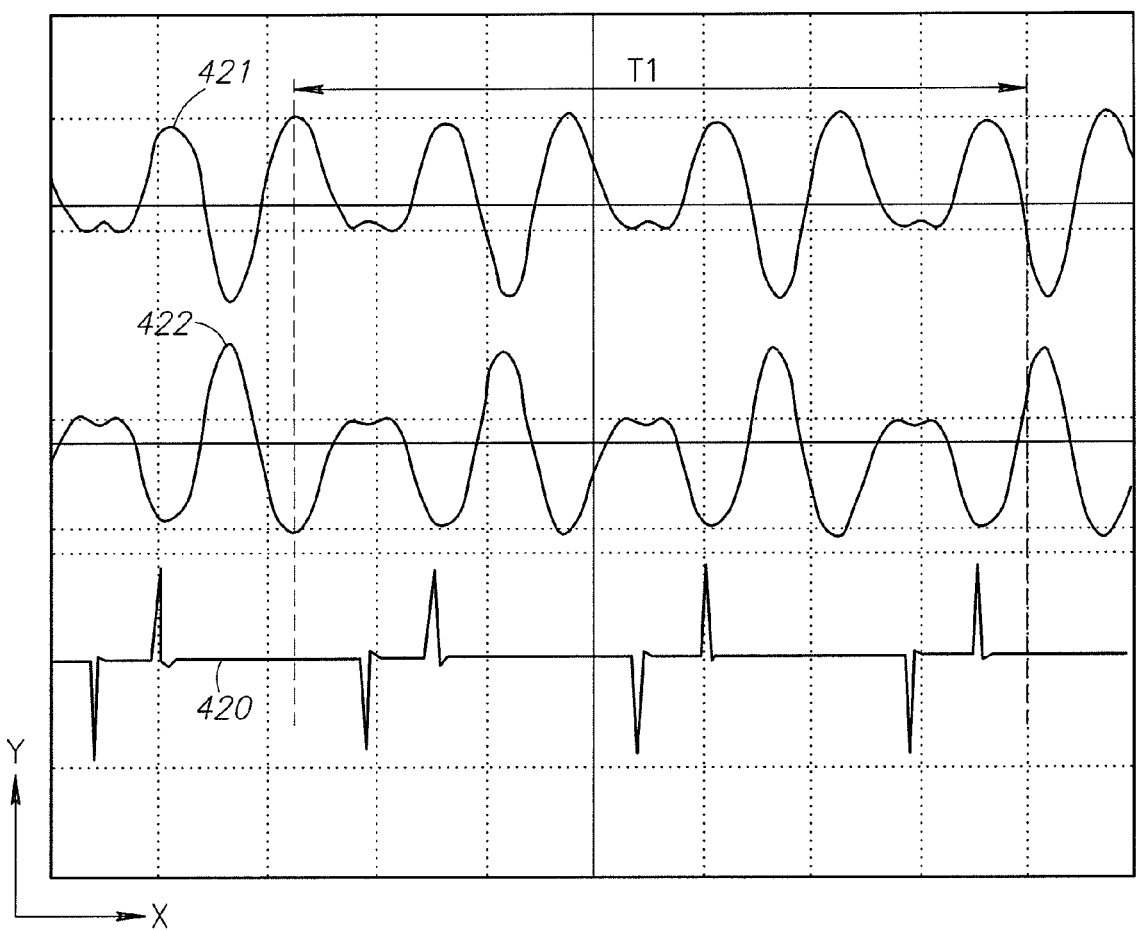
FIG. 8 is a diagram of waveforms resulting from filtration of the received signal.
Figure 9:
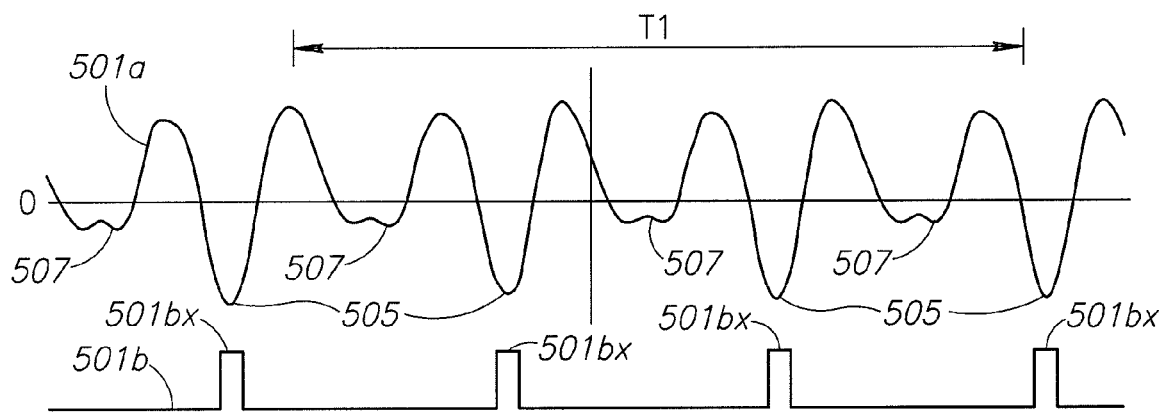
FIG. 9 is a diagram of waveforms of the received signal illustrating negative peaks.
Figure 9:
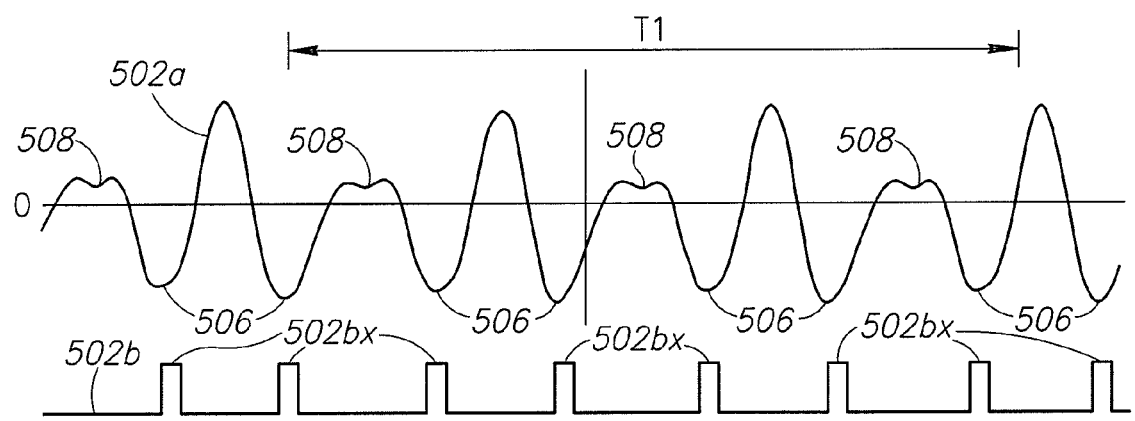

Attention is now directed to FIGS. 1, 8 and 9. In FIG. 1, there is shown an exemplary work area 24, bounded by the perimeter wire loop 28. The robot 22 may be either inside the perimeter wire loop 28 or outside of the perimeter wire loop 28, to illustrate FIGS. 8 and 9. In FIG. 1, the current from the signal generating unit 30 moves clockwise, around the perimeter wire loop 28, from OUT to IN, as indicated by the arrow AA. Similarly, the coil 200 in the robot 22 is wound in a manner that signals produced by the signal generating unit 30 will be in phase. Alternately, the current could move through the perimeter wire loop 28 counterclockwise, with all signal detection and pulse counts reversed for the robot 22 inside and outside the perimeter wire loop 28 (and the coil 200 of the robot 22 is in phase with the signal generating unit 30). For explanation purposes of the subject matter herein, the system will be described with the current moving clockwise around

TABLE 2

Signal Generating Unit 30

| COMPONENT NUMBER FROM FIGS. 7A-7C (FIG. 7) | COMPONENT | DESCRIPTION | MFGR. CODE |
| --- | --- | --- | --- |
| C1 | Capacitor | 10 nano Farads (nF) | |
| C2 | Capacitor | 1 micro Farads (μF) 50 Volts (V) | |
| C3 | Capacitor | 10 μF 16 V | |
| C4 | Capacitor | 0.1 μF | |
| C11, C13, C14, C15, C16 | Capacitor | 560 pico Farads (pF) | |
| C12 | Capacitor | 180 nF 5% | |
| R4 | Resistor | 220 Ohms 1% | |
| R5 | Resistor | 680 Ohms 5% | |
| R19, R28, R29, R30 | Resistor | 470 Ohms | |
| R21, R22, R23, R24 | Resistor | 150 Ohms 7 W | |
| R27, R31, R32, R33 | Resistor | 1K Ohm 1% | |
| R35, R36, R37 | Resistor | 10K Ohm 1% | |
| R38, R39, R40 | Resistor | 12K Ohm 1% | |
| D1 | Schottky Diode | | 30BQ100 |
| D4 | Schottky Diode | | MBR0540T1 |
| U1 | 8 Bit Microprocessor | | PIC16F627A-04/S0 or PIC16LF627/1K/25b |
| U2 | Voltage Regulator | | LM317D2T |
| Q4, Q5, Q6, Q7, Q8, Q9 | Transistor | | MMBT2222A |
| Q10, Q11, Q12 | Transistor | | MMBT2907A |
| Q13, Q14, Q15 | MOSFET | | NDT2955 |
| Q16, Q17, Q18 | MOSFET | | NTF3055L |

The signal is generated by a microprocessor 404 of the controller 304, and drives an H-bridge of Field Effect Transistors (FETs). This circuit generates two types of signals: the primary, along line 406, with a bridge formed of field effect transistors Q13, Q16, Q14 and Q17, and the secondary, along line 407, with a bridge formed of field effect transistors Q13, Q16, Q15, Q18 (wire 27/28 connection at J2).

the perimeter loop 28 (in the direction of Arrow AA) and the coil 200 of the receiver 181 in the robot 22 wound accordingly, to be in phase with the signal generating unit 30.

In FIG. 8, there is shown current (along the y axis), as a function of time (along the x axis), with a time interval represented as T1. The current running through the perimeter loop 28 is represented by the line 420. The receiver 30 is such that there is a phase shift, for example, a 180° (degree) phase shift, between the signal, as received inside the perimeter wire loop 28, and outside of the perimeter wire loop 28. After the received signal has passed through the filtration circuit 204, the signal for the receiving coil 200 (and the robot 22) inside the perimeter wire loop 28 is represented by the line 421, while the signal for the receiving coil 200 (and the robot 22) outside the perimeter loop 28 is represented by the line 422. Line 422 is a 180° (degree) phase shift from line 421. Lines 421 and 422 represent received signals for the current being passed through the perimeter wire 28, such as the current for the signal shown in FIG. 7, represented by the line 310.

FIG. 9, to which attention is now directed, shows the time interval T1, for the filtered signal and the CABLE_IN/OUT signal (at the output U503B, from FIG. 5) in the cases that the receiver coil 200 of the robot 22 is outside the perimeter wire loop 28 (the filtered signal is 501a and the corresponding CABLE_IN/OUT signal is line 501b, as converted into pulses), and inside the perimeter loop 28 (the filtered signal is 502a and the corresponding CABLE_IN/OUT signal is line 502b, as converted into pulses). Applying negative peak detection, as performed by the negative peak detector Q110 shown and described for FIG. 5 above, each major negative peak of lines 501a and 502a results in a pulse 501bx, 502bx in corresponding lines 501b and 502b, respectively.

Peaks of the signal, represented by lines 501a and 502a respectively, in particular, the major negative peaks below the "0" line, also known and referred to as dips, and indicated by 505 and 506 in lines 501a and 502a, respectively are detected. When the robot 22 is inside the perimeter wire loop 28, represented by lines 502a and 502b, the frequency and accordingly, the major negative peaks are double the frequency of major negative peaks for the robot 22 outside of the perimeter wire loop 28, represented by lines 501a, 501b. Specifically, there are twice as many major negative peaks 506 for the signal of the line 502a (indicative of the robot 22 inside the perimeter loop 28), as indicated by the pulses 502bx of line 502b, than (major negative peaks 505) for the signal of line 501a, as indicated by the pulses 501bx of line 501b (indicative of the robot 22 outside of the perimeter loop 28). The frequency is indicative of the position of the receiver coil 200 (on the robot 22) (either inside or outside the perimeter loop 28). The detection of this frequency "f" is represented as either "f" for the receiver coil 200 of the robot 22 outside the perimeter loop 28 and "2f" for the receiver coil 200 of the robot 22 inside the perimeter loop 28.

The pulses 501bx, 502bx of lines 501b or 502b are input into the control system 104 of the robot 22, for example, as data, such as digital data. The control system 104, via the electronics of the main bard 150, processes this data to determine robot 22 location inside or outside of the perimeter loop 28 and control robot 22 operation.

Figure 10:
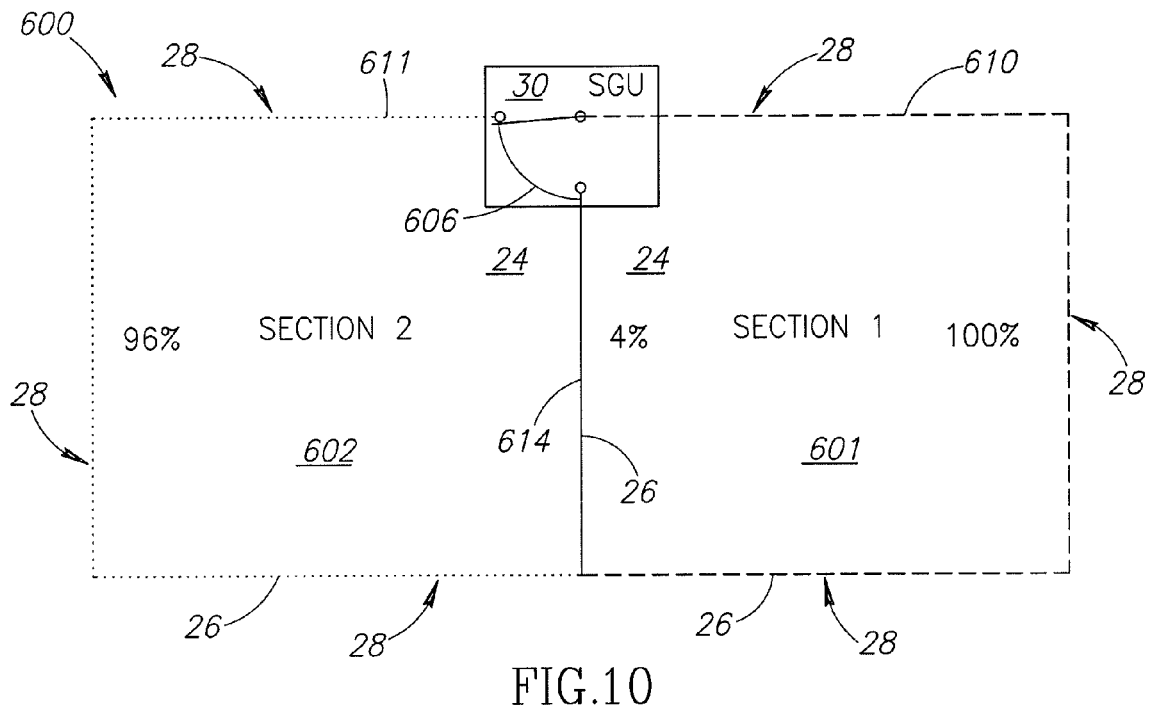
FIG. 10 is a diagram of the system of FIG. 1 shown with the work area separated into two sections.

Attention is now directed to FIG. 10, that details another system 600. This system 600 employs the robot 22 in a work area 24, with the work area 24 divided into multiple sections or plots, as would be typical with a lawn, garden or the like. This system 600, with the work area 24 divided into multiple sections allows for the operation of a robot 22, or alternately, several robots (or guided vehicles) operating at the same time (each vehicle in a different section or plot), in different sections or plots. The system 600 allows a detection of various parts on the perimeter loop 28, as well as the detection of a border or boundary line between sections of a work area 24.

For example, FIG. 10 shows the work area 24 divided into two sections, Section 1 601, and Section 2 602. The signal generating unit 30 includes a switch 606 or the like, whose default or primary connection is along the outer perimeter 608 of the work area 24, formed by dashed lines 610 and dotted lines 611. A wire 614 dividing the work area 24 into Section 1 601 and section 2, is represented as the solid line, and is the secondary connection for the switch 606.

The signal generating unit 30 sends the signal(s) through the primary connection of lines 610 and 611 and the secondary connection of lines 611 and 614, based upon the position of the switch 606. The switch 606 is, for example, programmed to alternate between the two positions at regular intervals. For example, the switch 606 is programmed to alternate between the two positions, resulting in a signal sent through the primary connection of lines 610 and 611 for approximately 48 milliseconds (ms) and through the secondary connection of lines 610 and 614 for approximately 2 ms.

As a result of this alternation, the dashed-line section 610 receives current 100% of the time the signal(s) is/are being generated by the signal generating unit 30. Similarly, the dotted line section 611 receives current 96% of the time the signal(s) is/are being generated, while line 614 receives current 4% of the time signals are being generated.

The receiver system 180 in the robot 22 measures the period of transmissions in each frame (where a frame is, for example, a 50 millisecond (ms) time interval or period). The receiver system 180 detects the dominant signal, that is emitted from the nearest wire 26 of the system 600. Once this wire 26 is detected, the robot 22, via the control system 104 (the main board electronics), determines the location of the robot 22, and for example, can determine if the robot 22 is in Section 1 601, Section 2 602, or outside Section 1 601 or outside Section 2 602. The robot 22, as programmed in the control system 104 (the main board electronics) can operate accordingly, for example, scanning differently based on the specific section in which the robot 22 is operating, moving into or out the requisite sections or moving along the wire 26, following it. For example, if it is desired to mow (operate in) Section 2 602, the robot 22 can drive along the perimeter wire 28 (formed of the dashed line 610) from Section 1 601, until Section 2 602 is detected. The robot 22 will then turn inside Section 2 602, and begin to scan Section 2 602.

One method or process for detecting the transmission periods for the signal(s) in each wire 610, 611, 614 is by counting the pulses of the major peak, for example the negative major peak detector described for the microprocessor 150a of the main board electronics of the robot 22, above (shown in FIG. 4) at each frame of time (for example, approximately 50 ms). With the signal generating unit 30 generating a 4 KHz signal, and a frame being 50 milliseconds, pulses (counted pulses) for this frame are in Table 3, as follows:

TABLE 3

|  | Robot 22 (and its receiver system 180) is outside the work area 24 as defined by the perimeter loop 28 | Robot 22 (and its receiver system 180) is inside Section 1 601 | Robot 22 (and its receiver system 180) is inside Section 2 602 |
| --- | --- | --- | --- |
| Dashed (- - - -) wire 610 | 200 | 400 |  |
| Dotted (••••••••••) wire 611 | 192 |  | 384 |
| Solid (———) wire 614 |  | 400 | 384 |

Since each pulse count is unique for the requisite time frame, it is possible to evaluate where the receiver system 180 and accordingly, the robot 22 is located with respect to the work area 24 and the requisite section or outside of the requisite section, according to the pulse count. As per Table 3, wire 610 receives current 100% of the time, so that 100% of the pulses from the signal (generated by the signal generating unit 30) over a 50 millisecond time frame is 400 pulses, for the robot 22 being inside Section 1 601. Since there is a phase shift of the received signal outside of the perimeter loop 28, from the phase of the received signal inside the perimeter loop 28, the received signal is inverted, reducing the number of major negative peaks by one-half outside of the perimeter wire loop 28, as shown in FIG. 9. Accordingly, with the robot 22 outside of Section 1 601, the received signal for the frame would result in a pulse count of 200 pulses, the decrease of pulses in accordance with the above-described phase shift.

Similarly, wire 611 receives current 96% of the time, so that 96% of the pulses from the signal(s) (generated by the signal generating unit 30) over a 50 millisecond (ms) time frame is 384 pulses, for the robot 22 being inside Section 2 602. Since there is phase shift, as detailed above, outside of the perimeter wire loop 28, the robot 22 being outside of Section 2 602 would be 192 pulses, the decrease of pulses in accordance with the phase shift.

Figure 11:
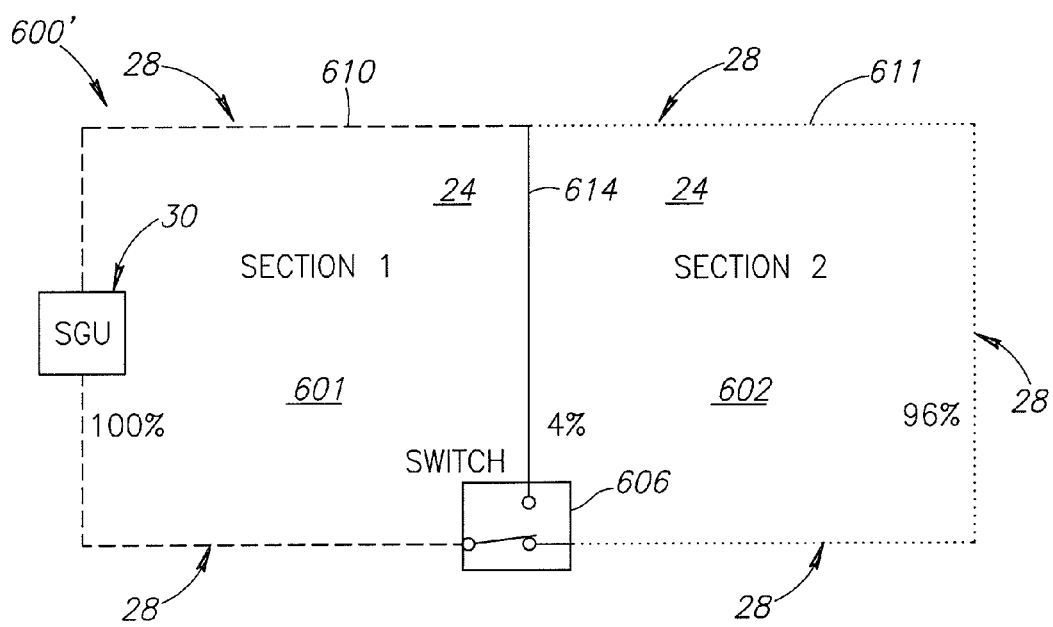
FIG. 11 is a diagram of an alternate arrangement of the system of FIG. 10.

FIG. 11 shows a system 600' that is similar to FIG. 10, except that Section 1 601 and Section 2 602 are reoriented based on the position of the signal generating unit 30 and the switch 606 is separate (outboard) from the signal generating unit 30. This switch 606 may be controlled by a controller 630 (also a remote controller) electronically linked to the switch 606 by wired or wireless links, or combinations thereof.

FIG. 12 shows an example of a system 699 using the above described negative peak detection with an off-perimeter charging station 700. The charging station 700 is placed outside the lawn or work area 24, off of the perimeter loop 28. The work area 24 and perimeter loop 28 are represented by line segments 702, 703, 704, 705a, 705b. There is node 708 between segments 705a and 705b, and a junction, indicated by point 710. An off perimeter path 712 from the work area 24 to the charging station 700 is represented by line segments 714, 715. These segments 714, 715 extend from the charging station 700 to the junction 710 and connect to segments 702 and 705b respectively. A dashed line segment 718 extends from the node 708 to the charging station 700, specifically, to a switch 720 in the charging station 700.

For example, the switch 720 is programmed to alternate between two positions, resulting in a signal sent through the primary connection of segments 714, 702, 703, 704, 705a and 718 for approximately 48 milliseconds (ms) and through the secondary connection of segments 715, 705b and 718 for approximately 2 ms.

As a result of this alternation, the dashed-line segment 718 receives current 100% of the time the signal(s) is/are being generated by the signal generating unit 30. Similarly, the line formed of segments 714, 702, 703, 704 and 705a receives current 96% of the time the signal(s) is/are being generated, while segments 705b and 715 receive current 4% of the time signals are being generated.

In an exemplary operation, the robot 22 moves to the junction 710 during the "edge" mode, following along the perimeter wire 28 of the work area 24, and then slows down (as programmed into the control unit 140, the main board electronics) upon receiving a count of pulses of 100%, for example 400 for one time interval or period of a 50 ms frame) and continue to the charging station 700. Upon departure from the charging station 700, the robot 22 will reverse until it meets the 96% signal at the junction 710 and than turns left, to move along the segment 705b, and the remainder of the perimeter loop 28 (formed of segments 705a, 704, 703 and 702), to operate in the work area 24.

The pulses, as counted by the receiver system 180 of the robot 22, as detailed above, also allow for the robot 22 to determine its location within the work area 24, along the off perimeter path 712 to the docking station 700, and outside of the work area 24. The aforementioned pulse counting method also allows the robot 22 to detect a border or boundary line 26 during scanning, while the robot travels inside the work area 24 surrounded by the perimeter loop 28.

Figure 13:
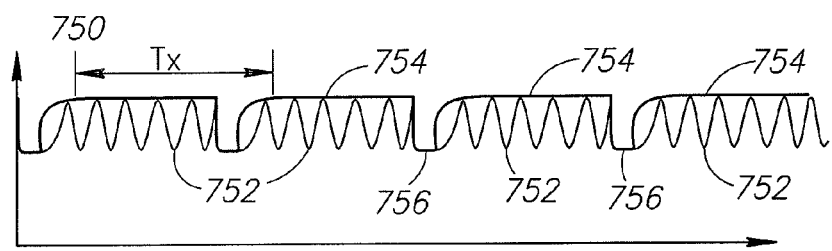
FIG. 13 is a diagram of a wave form of a received signal illustrating pulse trains and dead time of transmission.

FIG. 13 shows the received signal at the output of the negative peak detector Q110, detailed above, also known as a dip detector, as a line 750, when the robot 22 is approaching the border line 614 between Section 1 601 and Section 2 602, as shown in FIGS. 10 and 11, The received signal of line 750 is, for example, expressed in terms of pulses in pulse trains 752 (corresponding to the pulses of lines 501b and 502b) and "dead time," when pulses are not being transmitted (a signal is not being passed through the requisite wire section). For example, at line 614, pulses are being transmitted 96% of the "dead time". The pulses are smoothed over, resulting in smoothed portions 754 of the signal, with the "dead time" resulting in major negative peaks or dips 756. The major negative peaks or dips 756 in the signal, for each frame (interval, or time period) (Tx), are analyzed in the microprocessor 150a of the main board electronics, like the negative peaks of FIG. 9, as detailed above.

Figure 14:
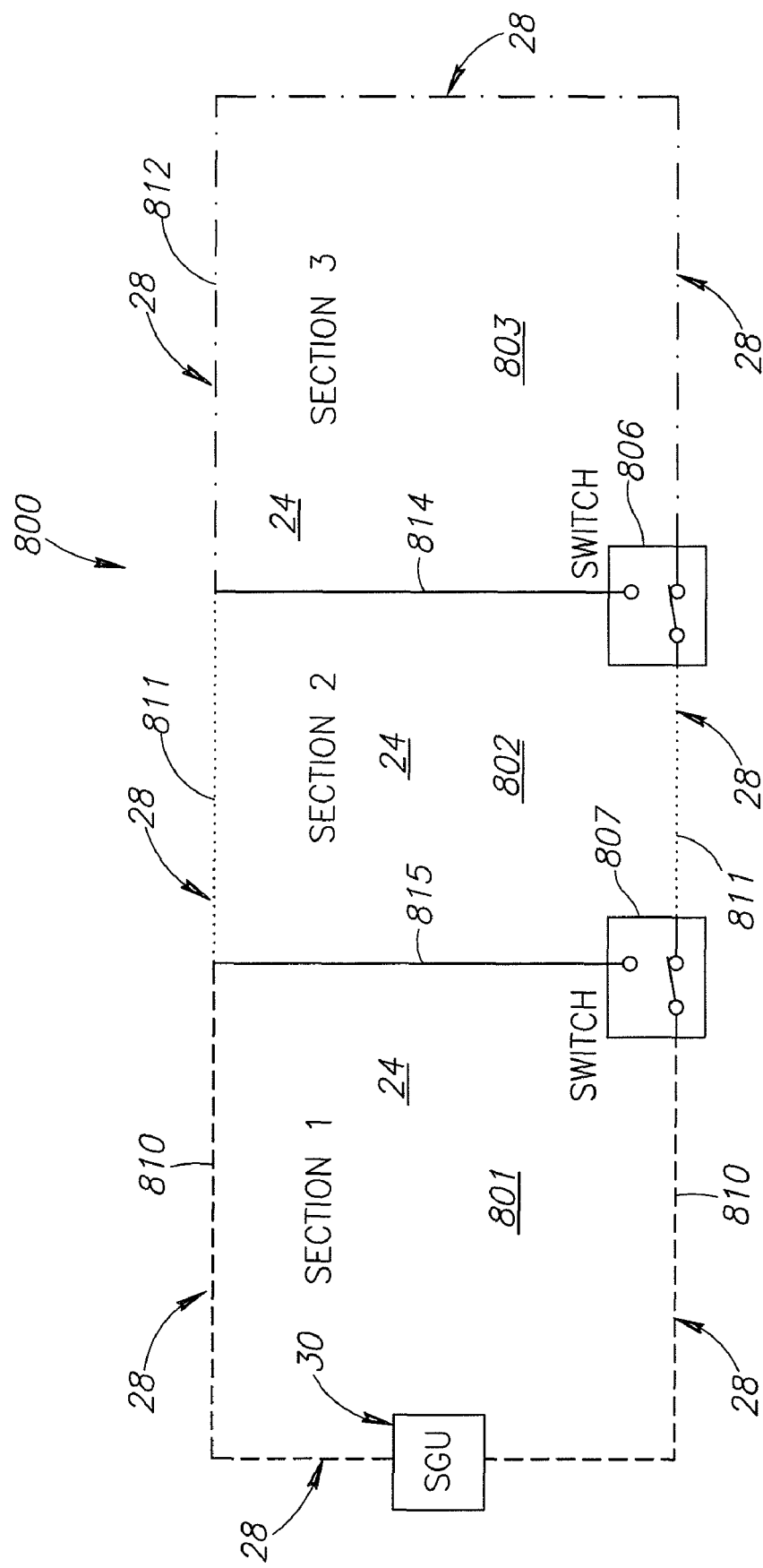
FIG. 14 is a diagram of the system with the work area separated into three sections.

FIG. 14 shows a system 800 similar to the systems 20, 600 and 600', except the work area 24 is divided into three sections, Section 1 801, Section 2 802 and Section 3 803. There is a signal generating unit 30 and two switches 806, 807, separate from the signal generating unit 30. Each switch 806, 807 has a default or primary connection is along the outer perimeter 808 of the work area 24, represented by dashed lines 810, dotted lines 811, and dash-dot lines 812. Wires, represented by solid lines 814 and 815, respectively, divide Section 1 801 from Section 2 802, and Section 2 802 from Section 3 803, are the secondary connections for the switches 806, 807.

The signal generating unit 30 sends the signal(s) through the primary connection of lines 810, 811 and 812, the secondary connection of line 814 and the tertiary connection of line 815, based upon the position of the switches 806, 807. The switches 806, 807, for example, are programmed to be synchronized, such that the switch 807 connects to line 815 only when the switch 806 connects to line 811. For example, in a frame of a 50 ms time interval or period, the switches 806, 807 are programmed to alternate between the two positions, resulting in a signal sent through the primary connection of lines 810, 811 and 812 for approximately 46 milliseconds (ms), through the secondary connection of lines 810, 811 and 815 for approximately 2 ms, and through the tertiary connection of lines 810 and 814 for approximately 2 ms.

As a result of this alternation, the dashed-line section 810 receives current 100% of the time the signal(s) is/are being generated by the signal generating unit 30. Similarly, the dotted line section 811 receives current 96% of the time the signal(s) is/are being generated, and the dash-dot line 812 receives current 92% of the time the signal(s) is/are being generated.

The receiver system 180 in the robot 22 measures the period of signal transmissions in each frame (where a frame is, for example, 50 millisecond time interval or period). The receiver system 180, recognizes the dominant signal and detects the nearest wire 26. Once this wire 26 is detected, the robot 22, via the control system 104 (main board electronics), determines the location of the robot 22, in accordance with that detailed above, and, for example, can determine if the robot 22 is in Section 1 801, Section 2 802, Section 3 803, or outside each of these sections. The robot 22, as programmed in the control system 104, and can operate accordingly, for example, scanning differently based on the specific section in which the robot 22 is operating, moving into or out the requisite sections 801-803 or moving along the perimeter wire 28, following it. For example, if it is desired to mow (operate in) Section 2 802, the robot 22 can move along the perimeter wire 28 (formed of the dashed line 810) from Section 1 801, until Section 2 802 is detected. The robot 22 will then turn inside Section 2 802, and begin to scan Section 2 802.

One method or process for detecting the transmission periods for the signal(s) in each wire, represented by the respective lines 810, 811, 812, 814 and 815, by counting the pulses of the negative-peak detector described for the control system 104 (main board electronics) of the robot 22, above (shown in FIG. 5) at each frame of time (for example, approximately 50 ms). With the signal generating unit 30 generating an 4 KHz signal (as detailed above), and a frame being 50 milliseconds, pulses (counted pulses) for this frame are in Table 4, as follows:

TABLE 4

| Wire | Signal period in each frame | Pulse count made by the robot inside the sections of the work area near the respective wire/line |
|---|---|---|
| Dashed (- - - - -) wire-line 810 | 100% | 400 |
| Dotted (••••••••••••) wire-line 811 | 96% | 384 |
| Dash-Dot (-•-•-•-) wire-line 812 | 92% | 368 |

Similar to that described above, for FIGS. 10 and 11, each section of the perimeter wire loop 28 results in a unique count. Thus, the location of the robot 22 is determined from the requisite unique count.

All of the systems and methods above have been shown with negative peak detection based on the current direction, for example, clockwise when making reference to FIGS. 1, 10-12 and 14. However, if the current from the signal generating unit 30 was reversed, for example, counterclockwise when referencing FIGS. 1, 10-12 and 14 (or from IN to OUT of FIG. 1, or in the opposite direction of Arrow AA of FIG. 1), positive peak detection (for example, major positive peak detection) would be used with the disclosed subject matter, with slight modifications, as detailed above.

The systems, including systems 20, 600, 600', 699, 800 and embodiments thereof, as described above, are scaleable. They may be applied to as many sections of a work area 24 as desired in accordance with that detailed above.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

While preferred embodiments have been described, so as to enable one of skill in the art to practice the disclosed subject matter, the preceding description is intended to be exemplary only. It should not be used to limit the scope of the disclosed subject matter, which should be determined by reference to the following claims.

What is claimed is:

1. A system for determining the location of a receiver with respect to a boundary, comprising:
    a boundary marker for defining at least one boundary, the boundary marker for supporting at least one signal being transmitted therethrough, the at least one signal including at least one positive pulse and at least one negative pulse within a predetermined interval; and
    at least one receiver system including at least one receiver for receiving the at least one signal, and at least one detector electrically coupled to the at least one receiver, the at least one detector configured for detecting peaks in the at least one signal.

2. The system of claim 1, additionally comprising:
    a signal generating unit; and
    wherein the boundary maker includes a perimeter wire loop in communication with the signal generating unit.

3. The system of claim 2, wherein the at least one detector configured for detecting peaks in the at least one signal is configured for detecting major peaks.

4. The system of claim 2, wherein the at least one detector configured for detecting major peaks is configured for detecting major negative peaks.

5. The system of claim 2, additionally comprising: a robot, the robot including the at least one receiver and the at least one detector.

6. The system of claim 5, wherein the at least one detector is configured for converting the detected major negative peaks into digital data.

7. The system of claim 6, wherein the robot additionally comprises:
    a processor in electronic communication with the at least one detector for receiving the digital data associated with the detected major negative peaks, the processor programmed to:
        determine the location of the robot with respect to the boundary marker in accordance with the digital data.

8. The system of claim 7, wherein the processor programmed to determine the location of the robot with respect to the digital data includes being programmed to count the digital data in the form of pulses and compare the pulses to predetermined pulse counts to determine the location of the robot.

9. A method for determining the location of a robot with respect to a boundary comprising:
    providing a robot including:
    at least one receiver for receiving a signal transmitted from a boundary, the transmitted signal including at least one positive pulse and at least one negative pulse within a predetermined transmission interval;
    at least one detector electrically coupled to the receiver for detecting peaks in the signal; and
    a processor electrically coupled to the at least one detector, the processor programmed to analyze data corresponding to the detected peaks for determining the location of the robot with respect to the boundary;
    detecting major peaks in the signal; and
    analyzing data corresponding to the major peaks detected over a predetermined receiving interval against predetermined data to determine the location of the robot with respect to the boundary.

10. The method of claim 9, wherein the major peaks include major negative peaks, the at least one detector in the robot configured for converting major negative peaks into digital data, and the method additionally comprising:

converting the detected major negative peaks into digital data corresponding to pulses; and counting the pulses corresponding to the detected major negative peaks.

11. The method of claim 10, wherein analyzing the major negative peaks includes comparing the counted pulses corresponding to the detected major negative peaks against predetermined pulse counts to determine the location of the robot with respect to the boundary.

12. A method for determining the location of a robot with respect to a boundary comprising:

providing a robot including:

at least one receiver for receiving a signal transmitted from a boundary, the transmitted signal including at least one positive pulse and at least one negative pulse within a predetermined period and transmitted at predetermined transmission intervals; and at least one detector electrically coupled to the receiver for detecting peaks in the signal;

detecting major peaks in the received signal corresponding to the time the signal is not being transmitted; and analyzing data corresponding to the major peaks detected over a predetermined receiving interval against predetermined data to determine the location of the robot with respect to the boundary.

13. The method of claim 12, wherein the major peaks include major negative peaks.

* * * * *